(12) United States Patent  
Briggs

(10) Patent No.: US 9,578,704 B2
(45) Date of Patent: Feb. 21, 2017

(54) VOLTAGE CONVERTER AND LIGHTING APPARATUS INCORPORATING A VOLTAGE CONVERTER

(71) Applicant: ARKALUMEN INC., Ottawa (CA)

(72) Inventor: Gerald Edward Briggs, Ottawa (CA)

(73) Assignee: ARKALUMEN INC., Ottawa (CA)

( * ) Notice: Subject to any disclaimer, the term of this patent is extended or adjusted under 35 U.S.C. 154(b) by 0 days.

(21) Appl. No.: 14/740,244

(22) Filed: Jun. 15, 2015

(65) Prior Publication Data

US 2015/0351179 A1  Dec. 3, 2015

Related U.S. Application Data

(63) Continuation of application No. 13/548,189, filed on Jul. 12, 2012, now Pat. No. 9,060,400.

(60) Provisional application No. 61/507,117, filed on Jul. 12, 2011.

(51) Int. Cl.
| | |
|---|---|
| H05B 33/08 | (2006.01) |
| H05B 41/282 | (2006.01) |
| H05B 37/00 | (2006.01) |
| H05B 37/02 | (2006.01) |
| B23K 11/24 | (2006.01) |

(52) U.S. Cl.
CPC ...... *H05B 33/0827* (2013.01); *H05B 33/0815* (2013.01); *H05B 33/0857* (2013.01); *H05B 37/00* (2013.01); *H05B 37/02* (2013.01); *H05B 41/2827* (2013.01); *B23K 11/248* (2013.01)

(58) Field of Classification Search
CPC ............ H05B 41/2827; H05B 33/0089; H05B 33/0815; F21S 4/1001; B23K 11/248

USPC .............. 315/186, 152, 219, 251, 307, 297, 224,315/193
See application file for complete search history.

(56) References Cited

U.S. PATENT DOCUMENTS

| | | |
|---|---|---|
| 4,593,234 A | 6/1986 | Yang |
| 5,006,782 A | 4/1991 | Pelly |
| 5,237,264 A | 8/1993 | Moseley et al. |
| 5,248,919 A | 9/1993 | Hanna et al. |
| 5,783,909 A | 7/1998 | Hochstein |
| 5,803,579 A | 9/1998 | Turnbull et al. |
| 5,932,995 A | 8/1999 | Wagoner |

(Continued)

FOREIGN PATENT DOCUMENTS

WO  WO-0113038 A1  2/2001

*Primary Examiner* — Douglas W Owens
*Assistant Examiner* — Syed M Kaiser
(74) *Attorney, Agent, or Firm* — Murray IP Consulting Inc; Sean Murray

(57) ABSTRACT

A lighting apparatus that may comprise a voltage converter operable to supply a current to at least two LED channels coupled between a high voltage rail and a low voltage rail coupled to the voltage converter output is disclosed. The LED channels may be operated to selectively allow a current to flow through them. The lighting apparatus may also have a control module operable to control the total current from the voltage converter and the current through each of the LED channels. The control module may also be operable to set the respective control signals to maintain a constant total current from the voltage converter while permitting aspects of the light output including, the intensity, color, and color temperature to be set and varied. Additionally, the control module may be operable to synchronize the various control signals, obtain a representative sample of the current through the voltage converter, and operate in different modes.

22 Claims, 11 Drawing Sheets

(56) References Cited

U.S. PATENT DOCUMENTS

| | | |
|---|---|---|
| 5,949,539 A | 9/1999 | Britton, Jr. et al. |
| 6,127,798 A | 10/2000 | Lansang et al. |
| 6,150,774 A | 11/2000 | Mueller et al. |
| 6,175,195 B1 | 1/2001 | Janczak et al. |
| 6,198,230 B1 | 3/2001 | Leeb et al. |
| 6,222,352 B1 | 4/2001 | Lenk |
| 6,307,331 B1 | 10/2001 | Bonasia et al. |
| 6,351,079 B1 | 2/2002 | Willis |
| 6,400,482 B1 | 6/2002 | Lupton et al. |
| 6,426,599 B1 | 7/2002 | Leeb |
| 6,441,558 B1 | 8/2002 | Muthu |
| 6,445,139 B1 | 9/2002 | Marshall et al. |
| 6,495,964 B1 | 12/2002 | Muthu et al. |
| 6,504,633 B1 | 1/2003 | Hovorka et al. |
| 6,518,561 B1 | 2/2003 | Miura |
| 6,548,967 B1 | 4/2003 | Dowling et al. |
| 6,596,977 B2 | 7/2003 | Muthu et al. |
| 6,621,235 B2 | 9/2003 | Chang |
| 6,794,831 B2 | 9/2004 | Leeb et al. |
| 6,853,150 B2 | 2/2005 | Clauberg et al. |
| 6,894,442 B1 | 5/2005 | Lim et al. |
| 6,954,591 B2 | 10/2005 | Lupton et al. |
| 7,016,115 B1 | 3/2006 | Leeb et al. |
| 7,141,779 B1 | 11/2006 | Chew et al. |
| 7,233,115 B2 | 6/2007 | Lys |
| 7,256,554 B2 | 8/2007 | Lys |
| 7,265,681 B2 | 9/2007 | Chen |
| 7,321,203 B2 | 1/2008 | Marosek |
| 7,352,135 B2 | 4/2008 | Shiotsu et al. |
| 7,457,089 B2 | 11/2008 | Ohshima |
| 7,486,032 B2 * | 2/2009 | Lee .................. H05B 33/0815 315/246 |
| 7,495,425 B2 | 2/2009 | Friedrich |
| 7,498,754 B2 | 3/2009 | Masood |
| 7,511,463 B2 | 3/2009 | Kumar |
| 7,633,577 B2 | 12/2009 | Moon et al. |
| 7,649,326 B2 | 1/2010 | Johnson et al. |
| 7,683,470 B2 | 3/2010 | Lee et al. |
| 7,683,504 B2 | 3/2010 | Blair et al. |
| 7,750,616 B2 | 7/2010 | Liu |
| 7,759,881 B1 | 7/2010 | Melanson |
| 7,847,783 B2 | 12/2010 | Liu et al. |
| 8,105,854 B2 | 1/2012 | Lee et al. |
| 8,193,737 B2 | 6/2012 | Peker et al. |
| 8,232,742 B2 | 7/2012 | Briggs |
| 8,247,975 B2 | 8/2012 | Yoo et al. |
| 8,248,439 B2 | 8/2012 | Ran et al. |
| 8,324,834 B2 | 12/2012 | Wang et al. |
| 8,358,085 B2 | 1/2013 | Catalano et al. |
| 8,587,203 B2 | 11/2013 | Chen et al. |
| 8,766,162 B2 | 7/2014 | Tanase |
| 2004/0119602 A1 | 6/2004 | Blum et al. |
| 2004/0263093 A1 | 12/2004 | Matsubayashi et al. |
| 2005/0127888 A1 | 6/2005 | Marschalkowski et al. |
| 2005/0156644 A1 * | 7/2005 | Karnahan .......... H03K 19/0963 327/218 |
| 2005/0173924 A1 * | 8/2005 | French .................. H02J 7/0068 290/1 A |
| 2005/0199841 A1 | 9/2005 | O'Maley et al. |
| 2005/0213353 A1 * | 9/2005 | Lys ...................... F21S 48/325 363/17 |
| 2005/0225264 A1 | 10/2005 | Kemp |
| 2005/0269580 A1 | 12/2005 | D'Angelo |
| 2006/0044800 A1 | 3/2006 | Reime |
| 2006/0049782 A1 | 3/2006 | Vornsand et al. |
| 2006/0113975 A1 | 6/2006 | Mednik et al. |
| 2006/0239689 A1 | 10/2006 | Ashdown |
| 2007/0080911 A1 | 4/2007 | Liu et al. |
| 2007/0103086 A1 | 5/2007 | Neudorf et al. |
| 2007/0103832 A1 | 5/2007 | Ohshima |
| 2007/0159421 A1 | 7/2007 | Peker et al. |
| 2007/0182338 A1 | 8/2007 | Shteynberg et al. |
| 2007/0195552 A1 | 8/2007 | Park |
| 2007/0229047 A1 | 10/2007 | Sigamani et al. |
| 2007/0267978 A1 | 11/2007 | Shteynberg et al. |
| 2007/0268028 A1 | 11/2007 | Moyer et al. |
| 2007/0278974 A1 | 12/2007 | Van De Ven |
| 2008/0079705 A1 | 4/2008 | Yang et al. |
| 2008/0088769 A1 | 4/2008 | Kim et al. |
| 2008/0138085 A1 | 6/2008 | Lin et al. |
| 2008/0150449 A1 | 6/2008 | Wang et al. |
| 2008/0180040 A1 | 7/2008 | Prendergast et al. |
| 2008/0191642 A1 | 8/2008 | Slot et al. |
| 2008/0224636 A1 | 9/2008 | Melanson |
| 2008/0238341 A1 | 10/2008 | Korcharz et al. |
| 2008/0252664 A1 | 10/2008 | Huang et al. |
| 2008/0272277 A1 | 11/2008 | Wei |
| 2009/0027652 A1 | 1/2009 | Chang et al. |
| 2009/0096392 A1 | 4/2009 | Chandran et al. |
| 2009/0134817 A1 | 5/2009 | Jurngwirth et al. |
| 2009/0160422 A1 | 6/2009 | Isobe et al. |
| 2009/0167194 A1 | 7/2009 | Mizuta |
| 2009/0174337 A1 | 7/2009 | Miskin et al. |
| 2009/0195168 A1 * | 8/2009 | Greenfeld .......... H05B 33/0815 315/192 |
| 2009/0195183 A1 | 8/2009 | Yang |
| 2009/0251059 A1 | 10/2009 | Veltman |
| 2009/0251071 A1 | 10/2009 | Gater et al. |
| 2009/0322252 A1 | 12/2009 | Shiu et al. |
| 2010/0019692 A1 | 1/2010 | Kimura |
| 2010/0033146 A1 | 2/2010 | Irissou et al. |
| 2010/0033150 A1 * | 2/2010 | Irissou .................. H02M 3/158 323/284 |
| 2010/0046210 A1 | 2/2010 | Mathai et al. |
| 2010/0060187 A1 | 3/2010 | Newman et al. |
| 2010/0066266 A1 | 3/2010 | Huang et al. |
| 2010/0072899 A1 | 3/2010 | Engstrand |
| 2010/0072902 A1 | 3/2010 | Wendt et al. |
| 2010/0079124 A1 | 4/2010 | Melanson |
| 2010/0100253 A1 | 4/2010 | Fausak et al. |
| 2010/0102230 A1 | 4/2010 | Chang et al. |
| 2010/0117450 A1 * | 5/2010 | Azrai .................. G01R 19/0092 307/31 |
| 2010/0156319 A1 * | 6/2010 | Melanson .......... H05B 33/0839 315/297 |
| 2010/0164406 A1 | 7/2010 | Kost et al. |
| 2010/0171429 A1 | 7/2010 | Garcia et al. |
| 2010/0171442 A1 | 7/2010 | Draper et al. |
| 2010/0177127 A1 | 7/2010 | Akiyama et al. |
| 2010/0194308 A1 | 8/2010 | Zhao et al. |
| 2010/0264834 A1 * | 10/2010 | Gaines ................. H05B 33/083 315/152 |
| 2010/0277075 A1 | 11/2010 | Rees |
| 2010/0289424 A1 | 11/2010 | Chang et al. |
| 2010/0302477 A1 | 12/2010 | Ohmi et al. |
| 2010/0320936 A1 | 12/2010 | Yao |
| 2010/0320939 A1 | 12/2010 | Lai |
| 2011/0006691 A1 | 1/2011 | Blaha et al. |
| 2011/0050130 A1 | 3/2011 | Rudolph |
| 2011/0068703 A1 * | 3/2011 | McKinney ......... H05B 33/0815 315/210 |
| 2011/0086676 A1 | 4/2011 | Choi et al. |
| 2011/0101950 A1 * | 5/2011 | Babb .................... H03H 19/008 323/299 |
| 2011/0115394 A1 | 5/2011 | Shteynberg et al. |
| 2011/0115412 A1 | 5/2011 | Welten |
| 2011/0187313 A1 | 8/2011 | Lee |
| 2011/0193489 A1 * | 8/2011 | Moss ................. H05B 33/0818 315/210 |
| 2011/0194047 A1 | 8/2011 | Bruyneel et al. |
| 2011/0227492 A1 | 9/2011 | Du et al. |
| 2011/0279040 A1 | 11/2011 | Briggs et al. |
| 2011/0279048 A1 | 11/2011 | Briggs |
| 2011/0279053 A1 | 11/2011 | Briggs |
| 2011/0279055 A1 | 11/2011 | Briggs |
| 2011/0279057 A1 | 11/2011 | Briggs |
| 2011/0298386 A1 | 12/2011 | Corradi |
| 2012/0146519 A1 | 6/2012 | Briggs |
| 2012/0262076 A1 | 10/2012 | Briggs |
| 2012/0268019 A1 | 10/2012 | Briggs |
| 2012/0312956 A1 | 12/2012 | Chang et al. |
| 2012/0320626 A1 | 12/2012 | Quilici et al. |
| 2013/0009561 A1 | 1/2013 | Briggs |

(56) References Cited

U.S. PATENT DOCUMENTS

2013/0015774 A1   1/2013  Briggs
2013/0223058 A1   8/2013  Briggs
2013/0293722 A1  11/2013  Chen
2013/0297251 A1  11/2013  Engel-Hall et al.
2013/0300316 A1  11/2013  Engel-Hall et al.

* cited by examiner

VOLTAGE CONVERTER AND LIGHTING APPARATUS INCORPORATING A VOLTAGE CONVERTER

CROSS-REFERENCE TO RELATED APPLICATION

The present application is a continuation of and claims the benefit under 35 USC 120 of U.S. patent application Ser. No. 13/548,189 entitled "CONTROL APPARATUS INCORPORATING A VOLTAGE CONVERTER FOR CONTROLLING LIGHTING APPARATUS" by Briggs filed on Jul. 12, 2012 which claims the benefit under 35 USC 119(e) of U.S. Provisional Patent Application 61/507,117 entitled "Dimmable LED Lighting Architecture Incorporating a Voltage Converter" by Briggs filed on Jul. 12, 2011 and hereby incorporated by reference herein.

FIELD OF THE INVENTION

The present invention relates generally to light emitting diode (LED) lighting systems, and more particularly to LED lighting systems incorporating a voltage converter.

BACKGROUND OF THE INVENTION

Lighting systems utilizing light emitting diodes (LEDs) are becoming increasingly popular and include systems employing constant current and constant voltage power supply architectures. Constant current systems may employ a power supply having a control system to output a desired current, within certain design parameters, irrespective of the number of LEDs attached to the power supply. In contrast, constant voltage power supply architectures require the number of LEDs and forward voltages across the LEDs to be accounted for in order to achieve adequate performance in many applications.

Constant voltage power supply architectures may employ power supplies having an adjustable output voltage that may be adjusted to suit a particular application. For example, a 24V power supply may be adjusted to have an output voltage of approximately 22V to provide a source of power to a group of seven LEDs connected in series between the power supply output and a reference ground. However, constant voltage power supplies having an adjustable output are more expensive and difficult to source compared to constant voltage power supplies having a fixed output voltage.

A constant voltage power supply having a fixed output voltage may be used with a voltage converter to achieve the desired output voltage for a particular application. The voltage converter may be connected to the output of the power supply to increase or decrease the voltage drop between the voltage converter output and a return path or low voltage rail. However, complications may arise as a result of LEDs having different forward voltages as a result of manufacturing tolerances or otherwise having different characteristics. Similarly, the forward voltage and current voltage characteristics may change as a result of changes in the temperature of the LEDs, which may affect the current flowing through the LEDs and therefore the intensity of light radiated from the LEDs. Discrepancies in the forward voltages of the LEDs may be problematic when various LED channels are connected in parallel.

Certain other known LED architectures that utilize pulse-width modulation (PWM) may result in relatively large current fluctuations that may increase as the total current through the LEDs increases. One example of an existing solution that mitigates against excessive current fluctuations and permits the intensity of light output from a plurality of LEDs to be varied is U.S. Pat. No. 7,759,881 issued Jul. 20, 2010 to Melanson. Melanson discloses a system employing a different dimming scheme based on the intensity of light output. For relatively high intensities (i.e. limited dimming), a feedback control system is used to adjust the current output from a voltage converter. At lower intensities, a low frequency PWM signal is also modulated with the control signal to further limit the average current flowing through the LEDs. However, the control architecture in Melanson is limited and does not permit aspects of the light output, such as the color or color temperature, to be varied.

Other architectures having multiple LED strings or blocks in parallel are configured to effectively control each block independently. For example, U.S. Published Patent Application No. 2009/0134817 published May 28, 2009 (Jungwirth) discloses an architecture having a number of LED blocks that each have a separate voltage converter and control system between the power supply and ground so that each block is controlled independently. This architecture may be relatively complex and result in large current fluctuations in the current drawn from the power supply.

Certain other existing control systems for lighting apparatus utilizing a voltage converter may also have limited resolution to control the output voltage from the voltage converter. Additionally, the relationship between various control signals used in the lighting apparatus may contribute to a visible flicker of the light output from the lighting apparatus under certain operation conditions.

It would be desirable to develop a modular LED architecture that mitigates against known problems in the prior art.

SUMMARY OF THE INVENTION

In a first aspect of the invention there is provided a control apparatus for a lighting apparatus comprising: a voltage converter operable to receive an input voltage and generate an output voltage defined between a high voltage rail and a low voltage rail, the high voltage rail and low voltage rail coupled to the output of the voltage converter; wherein at least two LED channels coupled in parallel are operable to be coupled between the high voltage rail and the low voltage rail; and the voltage converter being operable to set the output voltage based at least partially on a voltage control signal by increasing the voltage on the low voltage rail; and a control module operable to receive an indication of the current flowing through the voltage converter and provide the voltage control signal to the voltage converter in response.

In a second aspect of the invention there is provided a control apparatus for a lighting apparatus comprising: a voltage converter operable to receive an input voltage and generate an output voltage defined between a high voltage rail and a low voltage rail, the high voltage rail and low voltage rail coupled to the output of the voltage converter; wherein at least two LED channels coupled in parallel are operable to be coupled between the high voltage rail and the low voltage rail; and the voltage converter being operable to set the output voltage based at least partially on a voltage control signal by decreasing the voltage on the high voltage rail; and a control module operable to receive an indication of the current flowing through the voltage converter and provide the voltage control signal to the voltage converter in response.

In a third aspect of the invention there is provided a lighting apparatus comprising: a buck converter operable to receive an input voltage and generate an output voltage defined between a high voltage rail and a low voltage rail, the high voltage rail and low voltage rail coupled to the output of the buck converter; at least two LED channels coupled in parallel between the high voltage rail and the low voltage rail, each of the at least two LED channels comprising a switching element coupled in series between the high voltage rail and the low voltage rail, the switching element operable to selectively allow a current to flow through the associated LED channel in response to a channel control signal; a control module operable to: receive an indication of the current flowing through the buck converter; set the output voltage of the buck converter in response to the indication of the current flowing through the buck converter by setting a duty cycle of a voltage control signal provided to the buck converter; and set the intensity of light output from each of the at least two LED channels by setting a duty cycle of the channel control signals coupled to the switching elements associated with each of the at least two LED channels.

In a fourth aspect of the invention there is provided a lighting apparatus comprising: a voltage converter operable to receive an input voltage and generate an output voltage defined between a high voltage rail and a low voltage rail, the high voltage rail and low voltage rail coupled to the output of the voltage converter; at least two LED channels coupled in parallel between the high voltage rail and the low voltage rail, each of the at least two LED channels further comprising a switching element coupled in series between the high voltage rail and the low voltage rail, wherein the switching elements are operable to selectively allow a current to flow through the LED channel; a control module operable to: provide a voltage control signal to the voltage converter to at least partially set the output voltage; and provide a channel control signal to each of the at least two switching elements to at least partially set the intensity of light output from each of the LED channels, wherein each channel control signal is set based at least partially on the voltage control signal.

In a fifth aspect of the invention there is provided a lighting apparatus comprising: a voltage converter operable to supply a total current to a high voltage rail coupled to the output of the voltage converter; at least two LED channels coupled in parallel between the high voltage rail and a low voltage rail coupled to the voltage converter, each of the at least two LED channels further comprising a switching element coupled in series between the high voltage rail and the low voltage rail, each switching element being operable to selectively allow a current to flow through the LED channel; a control module operable to: provide a voltage control signal to the voltage converter to at least partially set the total current; provide a channel control signal to each of the at least two switching elements to at least partially set the channel current through each of the LED channels; set the voltage control signal, and each of the channel control signals to maintain a constant total current.

In a sixth aspect of the invention there is provided a lighting apparatus comprising: a control module; a voltage converter operable to supply a total current to a high voltage rail coupled to the output of the voltage converter, the total current based on a voltage control signal received from the control module; a first LED channel coupled between the high voltage rail and a low voltage rail, the first LED channel operable to set a first channel current based at least partially on a first channel control signal received from the control module, wherein the first channel current is the current flowing through the first LED channel; a second LED channel coupled between the high voltage rail and the low voltage rail, the second LED channel operable to set a second channel current based at least partially on a second channel control signal received from the control module, wherein the second channel current is the current flowing through the second LED channel; and wherein the control module is operable to: set the voltage control signal provided to the voltage converter to set the total current to a scaled total current; set the first channel control signal to set the first channel current; set the second channel control signal to set the second channel current; and wherein the first and second channel control signals are set based at least partially on the scaled total current to maintain a constant total current.

In a seventh aspect of the invention there is provided a method of mapping the control signals used to control the light output from a lighting apparatus operating at a maximum desired total current, the lighting apparatus comprising a voltage converter operable to provide a total current based on a voltage control signal to a high voltage rail, first and second LED channels coupled between the high voltage rail and a low voltage rail and operable to selectively allow a current to flow based on first and second channel control signals, the method comprising: generating a scaled voltage control signal having a duty cycle so that the scaled total current is equal to the sum of the duty cycles of the first and second channel control signals; generating a scaled first channel control signal having a duty cycle equal to the duty cycle of the first channel control signal divided by the scaled total current and a phase equal to zero; generated a scaled second channel control signal having a duty cycle equal to the duty cycle of the second channel control signal divided by the scaled total current and a phase equal to the duty cycle of the scaled first channel control signal.

In an eighth aspect of the invention there is provided a control apparatus for a lighting apparatus comprising: a voltage converter operable to generate an output voltage defined between a high voltage rail and a low voltage rail coupled to the output of the voltage converter, the output voltage based at least partially on a voltage control signal received by the voltage converter; a control module operable to: set a duty cycle of the voltage control signal to a first value for a first portion of a fine control period; and set the duty cycle of the voltage control signal to a second value for a second portion of the fine control period so that the duty cycle has an average value between the first and second values to provide an increased resolution to control the output voltage from the voltage converter.

In a ninth aspect of the invention there is provided a control apparatus for a lighting apparatus comprising: a voltage converter operable to generate an output voltage defined between a high voltage rail and a low voltage rail coupled to the output of the voltage converter, the output voltage based at least partially on a voltage control signal received by the voltage converter; a control module operable to: set a duty cycle of the voltage control signal to a first value for a first number of timing blocks of a timing group; and set the duty cycle of the voltage control signal to a second value for a second number of timing blocks of the timing group so that the duty cycle has an average value between the first and second values to provide an increased resolution to control the output voltage from the voltage converter.

In a tenth aspect of the invention there is provided a method of operating a lighting apparatus, the lighting apparatus comprising a voltage converter operable to generate an output voltage based at least partially on a voltage control signal received by the voltage converter, the method comprising: setting a duty cycle of the voltage control signal to a first value for a first portion of a fine control period; and setting the duty cycle of the voltage control signal to a second value for a second portion of the fine control period so that the duty cycle has an average value between the first and second values to provide an increased resolution to control the output voltage from the voltage converter.

In an eleventh aspect of the invention there is provided a lighting apparatus comprising: a voltage converter operable to generate an output voltage defined between a high voltage rail and a low voltage rail coupled to the output of the voltage converter, the output voltage based at least partially on a voltage control signal received by the voltage converter; a LED channel coupled between the high voltage rail and the low voltage rail, the LED channel comprising a switching element coupled in series between the high voltage rail and the low voltage rail, the switching element operable to selectively allow a current to flow through the LED channel based on a channel control signal; a control module operable to: provide the channel control signal having a channel control period to the switching element; and receive an indication of the voltage converter current periodically after a sampling period, wherein the sampling period is different than the channel control period so that the control module receives an indication of the voltage converter current at a different portion of the channel control period in successive channel control periods.

In a twelfth aspect of the invention there is provided a lighting apparatus comprising: a voltage converter operable to generate an output voltage defined between a high voltage rail and a low voltage rail coupled to the output of the voltage converter, the output voltage based at least partially on a voltage control signal received by the voltage converter; a LED channel coupled between the high voltage rail and the low voltage rail, the LED channel comprising a switching element coupled in series between the high voltage rail and the low voltage rail, the switching element operable to selectively allow a current to flow through the LED channel based on a channel control signal; a control module operable to: provide the voltage control signal to the voltage converter, the voltage control signal having a first period; provide the channel control signal to the switching element, the channel control signal having a second period that is a multiple of the first period; and synchronize the voltage control and channel control signals to commence at substantially the same time.

In a thirteenth aspect of the invention there is provided a lighting apparatus comprising: a voltage converter operable to generate an output voltage defined between a high voltage rail and a low voltage rail coupled to the output of the voltage converter, the output voltage based at least partially on a voltage control signal received by the voltage converter; a LED channel coupled between the high voltage rail and the low voltage rail, the LED channel comprising a switching element coupled in series between the high voltage rail and the low voltage rail, the switching element operable to selectively allow a current to flow through the LED channel based on a channel control signal; a control module operable to: provide the channel control signal to the switching element and to set a duty cycle of the channel control signal to set the intensity of light emitted from the LED channel; set the voltage control signal to maintain a constant total current flowing through the voltage converter if the duty cycle of the channel control signal exceeds a threshold value; and maintain the voltage control signal if the duty cycle of the channel control signal is below the threshold value.

In a fourteenth aspect of the invention there is provided a lighting apparatus comprising: a voltage converter operable to generate an output voltage defined between a high voltage rail and a low voltage rail coupled to the output of the voltage converter, the output voltage based at least partially on a voltage control signal received by the voltage converter; a LED channel coupled between the high voltage rail and the low voltage rail, the LED channel comprising a switching element coupled in series between the high voltage rail and the low voltage rail, the switching element operable to selectively allow a current to flow through the LED channel based on a channel control signal; a control module operable to: provide the channel control signal to the switching element and to set a duty cycle of the channel control signal to set the intensity of light emitted from the LED channel; receive an indication of the voltage converter current; set the voltage control signal to maintain a constant total current flowing through the voltage converter based on the indication of the voltage converter current if the indication of the voltage converter current exceeds a threshold value; and maintain the voltage control signal if the indication of the voltage converter current is below the threshold value.

In a fifteenth aspect of the invention there is provided a control apparatus for a lighting apparatus comprising: a voltage converter operable to receive an input voltage and generate an output voltage defined between a high voltage rail and a low voltage rail, the high voltage rail and low voltage rail coupled to the output of the voltage converter; wherein an LED channel is operable to be coupled between the high voltage rail and the low voltage rail; and wherein the voltage converter is operable to set the output voltage based at least partially on a voltage control signal; and a control module operable to: receive an indication of the current flowing through the voltage converter; receive an indication of the output voltage; look-up an offset reference for the indication of the output voltage; and generate the voltage control signal using at least partially the indication of the current flowing through the voltage converter and the offset reference.

BRIEF DESCRIPTION OF THE DRAWINGS

In the figures which illustrate by way of example only, embodiments of the present invention.

DETAILED DESCRIPTION OF EMBODIMENTS

In LED lighting architectures employing constant voltage power supplies, referred to as constant voltage architectures, it is important to provide a suitable voltage to the LEDs and ensure that the current supplied does not exceed certain thresholds. As noted above, certain constant voltage power supplies have an adjustable output voltage. Other power supplies having a fixed output voltage are more readily available and economical and may be used in conjunction with a voltage converter to provide a certain output voltage to the LEDs in a lighting system.

Figure 1:
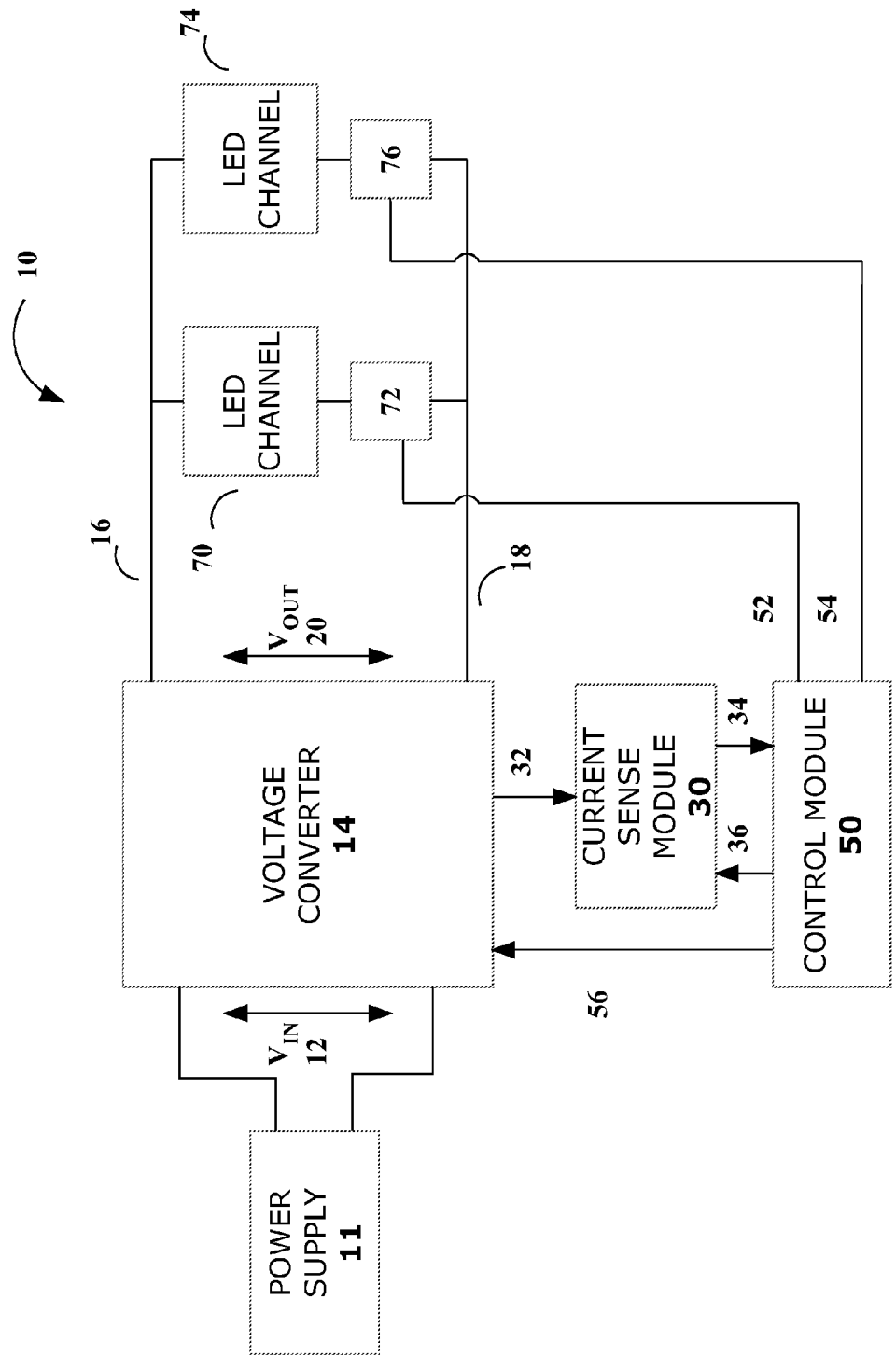
FIG. 1 is a schematic diagram illustrating the architecture of an embodiment of the invention.

A schematic of the architecture of an embodiment of the lighting apparatus 10 is shown in FIG. 1. A power supply 11 may be coupled to a voltage converter 14 and provide an input voltage 12 to voltage converter 14. The input voltage 12 may be defined between a positive supply and a reference ground. Power supply 11 may be a constant voltage power supply having a fixed output voltage, for example, a 24V power supply. The voltage converter 14 may function to generate an output voltage 20 defined between high voltage rail 16 and low voltage rail 18. The voltage converter 14 may function to increase or decrease the input voltage 12 to generate the output voltage 20 and function as a DC-DC converter. For example, voltage converter 14 may be a buck converter when it is desired that the output voltage 20 be less than the input voltage 12 and a boost converter when it is desired that the output voltage 20 be greater than the input voltage 12.

For example, where voltage converter 14 is implemented as a buck converter, the buck converter may be configured to raise the voltage on low voltage rail 18 to decrease output voltage 20, which is defined between high voltage rail 16 and low voltage rail 18. Alternatively, in other embodiments, a buck converter may be configured to reduce the voltage provided to high voltage rail 16 to reduce the output voltage 20.

One or more LED channels, for example, LED channels 70 and 74 may be coupled between high voltage rail 16 and low voltage rail 18. In other embodiments, a single LED channel or more than two LED channels may be used with suitable modification without departing from the scope of the invention. LED channels 70 and 74 may be comprised of a plurality of LEDs as described below with reference to FIG. 4. In this configuration, the high voltage rail 16 and low voltage rail 18 may be common to all LED channels of lighting apparatus 10 so that the voltage drop across each LED channel is approximately the same and only a single voltage converter 14 is required in certain embodiments.

Additionally, having a common high voltage rail 16 and common low voltage rail 18 may increase the modularity of the invention compared to known prior art. For example, having a high voltage rail 16 and/or common low voltage rail 18 may allow a single voltage converter 14 to be used with multiple light engines (including light engines implemented on different boards) that may be coupled together so that the invention may be readily adapted to a variety of situations. For example, the invention may be adapted to be used with a modular architecture, such as, that disclosed in "Modular LED Strip Lighting Apparatus" filed as U.S. Provisional Patent Application No. 61/467,914 on Mar. 25, 2011 by Briggs, which is hereby incorporated by reference.

Switching elements 72 and 76 may also be coupled in series with LED channels 70 and 74, respectively, between the high voltage rail 16 and low voltage rail 18. Switching elements 72 and 76 may also be coupled to control module 50 to receive channel control signals 52 and 54. Switching element 72 may function as a switch under the control of channel control signal 52 provided by the control module 50 so that switching element 72 is opened and closed within a cycle (i.e. pulse width modulated) to selectively allow a current to flow through LED channel 70. For example, switching element 72 may be implemented as an n-channel MOSFET having its gate coupled to channel control signal 52 and other control circuitry (e.g. a voltage divider) in certain implementations. Switching element 72 and channel control signal 52 may operate so that LED channel 70 is operated in a PWM manner with the intensity of the light output being dependent upon the duty cycle of the channel control signal 52. More specifically, the duty cycle of channel control signal 52 may determine the average current permitted to flow through LED channel 70 and therefore determine the average intensity of light output from LED channel 70. The frequency of channel control frequency 52 should be chosen to be compatible with the specific LEDs used and so that no perceivable flicker is apparent as a result of the pulse width modulation. For example, channel control signal may be chosen to be 1 KHz in certain embodiments, although other frequencies may also be used. Similarly, switching element 76 may operate under the control of channel control signal 54 to cause LED channel 74 to be pulse-width modulated to control the intensity of light emitted by LED channel 74.

In certain embodiments, described below in greater detail, the relative timing and relationship between the periods of voltage control signal 56 and channel control signals 52 and 54 may be chosen so that the respective control signals are synchronized to commence at the same point in time and be multiples of each other to maintain the synchronization over time.

Control module 50 may also provide a voltage control signal 56 that is received by voltage converter 14. Control module 50 may also be coupled to a current sense module 30 to receive a current sense voltage 34 from the current sense module 30 and provide a current sense control signal 36 to the current sense module 30. In certain embodiments, control module 50 may comprise a microcontroller, for example, PIC12F615 manufactured by Microchip Technology Inc. of Arizona, U.S.A. Other microcontrollers or other computing devices (e.g. ASIC, DSP) may be used in different embodiments without departing from the scope of the invention.

The current sense module 30 may be coupled to voltage converter 14 to receive a sense current 32 and output a current sense voltage 34 related to the sense current 32. For example, in a simple implementation, current sense module 50 may be implemented as a resistor having a known value so that the current sense voltage 34 is proportional to the sense current 32 and the control module 50 is able to calculate the sense current 32 based on the current sense voltage 34.

Control module 50 may use data related to the current sense voltage 34, for example, the voltage itself or an estimated sense current calculated based upon the current sense voltage 34 and the resistance of the current sense module 30, to generate voltage control signal 56 to be provided to voltage converter 14. Based on this feedback, control module 50 may cause the output voltage 20 to be increased or decreased by, for example, varying the duty cycle of voltage control signal 56 provided to voltage converter 14. Alternatively, the output voltage 20 may be set at least partially by setting the frequency of voltage control signal 56 in certain embodiments. For example, the output voltage 20 from the voltage converter 14 may be decreased when a current sense voltage 34 (proportional to sense current 32) is detected above a desired level to prevent an excess current from being delivered to LED channels 70 and 74 and maintain a relatively constant light output. In embodiments, where the voltage converter is implemented as a buck converter and an increase in the current sense voltage 34 (sense current 32) is detected by control module 50, the duty cycle of the voltage control signal 56, which may be a PWM signal, may be decreased to decrease the output voltage 20. Conversely, the output voltage 20 from a buck converter may be increased to increase the current flowing through LED channels 70 and 74 by increasing the duty cycle of the voltage control signal 56 where desired. Additional details regarding the operation of voltage converter 14, where the voltage converter 14 is implemented as a buck converter, are provided below with respect to FIG. 2.

Control module 50 may operate to control an aspect of the light output from lighting apparatus 10 by setting the channel control signals applied to each LED channel to control the average current and thereby control the average intensity of light output from each of the LED channels. For example, the duty cycle of channel control signal 52 applied to switching element 72 may be varied to vary the average intensity of light radiated by LED channel 70. Similarly, the duty cycle of the channel control signal 54 as applied to switching element 76 may be set to set the average intensity of the light radiated from LED channel 74. By setting the duty cycles of channel control signals 52 and 54 the intensity of the light emitted from lighting apparatus 10 may be set and varied by control module 50 to permit the light radiated from lighting apparatus 10 to be dimmed.

Similarly, other aspects of the light emitted from lighting apparatus 10 may be varied in certain embodiments. For example, LED channel 70 may comprise at least a subset of LEDs having a first color or color temperature. LED channel 74 may comprise at least a subset of LEDs having a second color or color temperature, the second color or color temperature being different than the first color or color temperature. By varying the duty cycle of channel control signals 52 and 54 the control module 50 may vary the relative intensity of the light radiated from LED channels 70 and 74 to vary the color or color temperature of the light emitted from the lighting apparatus 10.

In certain embodiments, it may be desirable to balance LED channels 70 and 74 so that the voltage drop across LED channels 70 and 74 are similar. The LED channels may be balanced by selecting the same number of LEDs having similar forward voltages for each of the LED channels, which may be accomplished by selecting LEDs that have been "binned" together by a manufacturer.

Additionally, the LED channels may be balanced in certain other embodiments by mounting the LEDs of each LED channel on a metal core printed circuit board. A metal core printed circuit board may distribute any increases in temperature between the LED channels (e.g. LED channels 70 and 74) relatively equally to avoid any temperature related performance variations, for example, forward voltage variations of the LEDs as the temperature changes. Mitigating against any disparate temperature effects between LED channels 70 and 74 may increase performance when one LED channel is operated at a materially higher average current than the other LED channel, for example, in certain color mixing applications where the color or color temperature of the light output may be varied.

Figure 2:
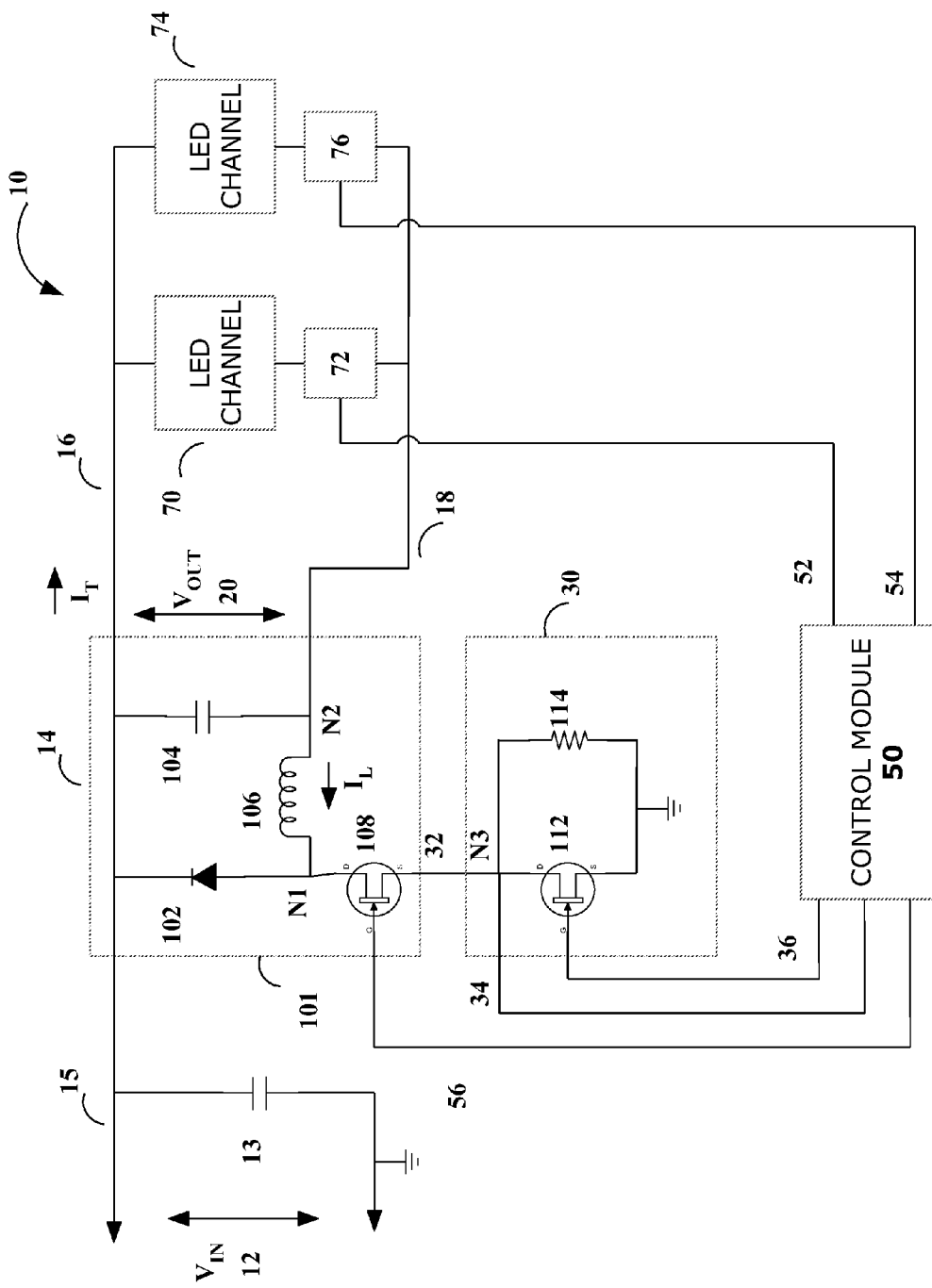
FIG. 2 is a schematic diagram illustrating additional detail of the architecture shown in FIG. 1.

An embodiment of the invention is shown in greater detail in FIG. 2. An input voltage 12 may be received at the input to voltage converter 14 and defined between positive supply 15 and a reference ground. An input capacitor 13 may be coupled between positive supply 15 and a reference ground before the positive supply 15 is coupled to voltage converter 14. The input capacitor 13 may function to mitigate against current spikes caused by voltage converter 14 and reinforce the output capacitance of power supply 11 to assist in supplying the required current to voltage converter 14. In the embodiment shown in FIG. 2, voltage converter 14 may be implemented as buck converter 101. Buck converters are known in the art and are a form of DC-DC voltage converters that operate to provide an output voltage that is lower than an input voltage to the buck converter. In other embodiments, other types of voltage converters may be used with suitable modification, for example, a boost converter which functions to provide an increased output voltage relative to the input voltage.

The buck converter 101, acting as voltage converter 14, in FIG. 2 may operate to increase the voltage on low voltage rail 18 to therefore reduce output voltage 20, which is defined between the high voltage rail 16 and low voltage rail 18. With suitable modification, a buck converter may also be employed to reduce output voltage 20 by reducing the voltage applied to high voltage rail 16 as described below with reference to FIG. 3. Buck converter 101 may comprise a diode 102 coupled between high voltage rail 16 and node N1, with diode 102 being biased to permit a current to flow from node N1 to high voltage rail 16. The diode may be a fast diode having a high current rating and high reverse breakdown voltage, for example, a schottky or super-fast diode. A capacitor 104 may be coupled between high voltage rail 16 and node N2. The capacitor may be, for example, a 1000 uF (microfarad) capacitor. An inductor 106, for example having an inductance of 33 uH (33 microhenry), may be coupled between nodes N1 and N2. More generally, inductor 106 should be chosen to store sufficient energy to maintain an adequate current when buck converter 101 is in a state where inductor 106 is being discharged. Additionally, a switching element, for example MOSFET 108 may be coupled between nodes N1 and N3. The gate of MOSFET 108 may be coupled to receive voltage control signal 56 from control module 50 so that MOSFET 108 may allow a current to flow from nodes N1 to N3 (drain to source) when the MOSFET is activated by voltage control signal 56 and prevent a current from flowing when the MOSFET is inactivated by voltage control signal 56.

Voltage control signal 56 may be a PWM signal having a duty cycle that may cause MOSFET 108, or more generally a switching element, to selectively allow a current to flow. When voltage control signal 56 is switched so that MOSFET 108 is in an active state and allows a current to flow (e.g.

control signal 56 is switched from low to high where the MOSFET is an n-channel MOSFET) the instantaneous voltage across inductor 106 between nodes N2 and N1 is increased. In this state, the inductor current $I_L$ gradually increases as the inductor charges which also results in a corresponding decrease in the voltage across the inductor 106 over time. As a result of the voltage across inductor 106, the voltage on the low voltage rail 18 is increased which results in a decreased output voltage 20.

After a period of time, the voltage control signal 56 may be set so that MOSFET 108 is switched from an active state allowing a current to flow to an inactive state preventing a current from flowing (e.g. switch the control signal from high to low where the MOSFET is an n-channel MOSFET). When MOSFET 108 is inactivated, the voltage across the inductor 107 from node N2 to N1 reverses polarity. As a result of the voltage decrease across inductor 106, the diode 102 is activated and a current may flow through the diode 102 to LED channels 70 and 74 as current is discharged from inductor 106. The voltage control signal 56 may then be set to again activate MOSFET 108 to allow a current to flow and change the state of the buck converter 101 in a periodic manner. Voltage control signal 56 may be a PWM signal having a period of 50 kHz in certain embodiments, although other frequencies are possible (e.g. 40 kHz), to allow buck converter 101 to output a relatively constant DC output voltage 20 notwithstanding that the control signal 56 is causing the buck converter 101 to alternate operational states. Capacitor 104 may also assist in providing a relatively smooth DC output voltage 20 by smoothing any ripple in the output voltage as the capacitor charges and discharges.

Current sense module 30 may be coupled between node N3 and a reference ground to receive sense current 32 from buck converter 101. Current sense module 30 may comprise a switching element 112, which may be a MOSFET, coupled in parallel with a resistor 114 between node N3 and a reference ground. Current sense control signal 36 may be coupled between switching element 112 and control module 50 so that switching element 112 may be controlled by control module 50. For example, current sense control signal 36 may be coupled to the gate of an n-channel MOSFET so that the MOSFET allows a current to flow when provided with a high value of control signal 36 (i.e. the MOSFET is active) and prevents a current from flowing when provided with a low value of control signal 36 (i.e. the MOSFET is inactive). In certain other embodiments, current sense module 30 may simply comprise a resistor connected in series between the input and reference ground, however, this may be inferior relative to the current sense module 30 depicted in FIG. 2.

Control module 50 may cause switching element 112 to be activated to allow a current to flow through it when the control module 50 is not sampling the current sense voltage 34. Activating switching element 112 decreases the combined resistance of the switching element 112 and resistor 114, since they are in parallel. When sampling the current sense voltage 34, control module 50 may deactivate switching element 112 so the resistance of the current sense module 30 is approximately the resistance of resistor 114. The current sense voltage 34 may be sampled for a relatively small time period before switching element 112 is activated again resulting in a lower amount of power dissipated in the current sense module 30 because of the reduced average resistance. Similarly, the accuracy of the current sense module 30 may be increased by allowing a resistor 114 having a larger resistance to be used increasing the current sense voltage 34 for a given current that may use more of the dynamic range of a analog-to-digital (AD) converter. Moreover, the average resistance may be further reduced by including additional switching elements (not shown), which may be MOSFETS controlled by current sense control signal 36, in parallel with switching element 112 to further reduce the average resistance of current sense module 30. The advantages and detailed operation of such a current sense architecture is described in detail in U.S. Provisional Patent Application Nos. 61/333,746 and 61/333,747 filed on May 11, 2010 by Briggs and U.S. patent application Ser. Nos. 13/104,919 and 13/104,926 filed on May 10, 2011 by Briggs all of which are assigned to Arkalumen Inc. of Ottawa, Ontario and are hereby incorporated by reference.

When sampling the current sense voltage 34, control module 50 may employ an AD converter to obtain a digital representation of the current sense voltage 34. This data may then be used directly or used to calculate the sense current 32 flowing through current sense module 30 by dividing the measured voltage by the resistance of the current sense module 30 when the switching element 112 is inactive and the current is sampled.

Figure 5:
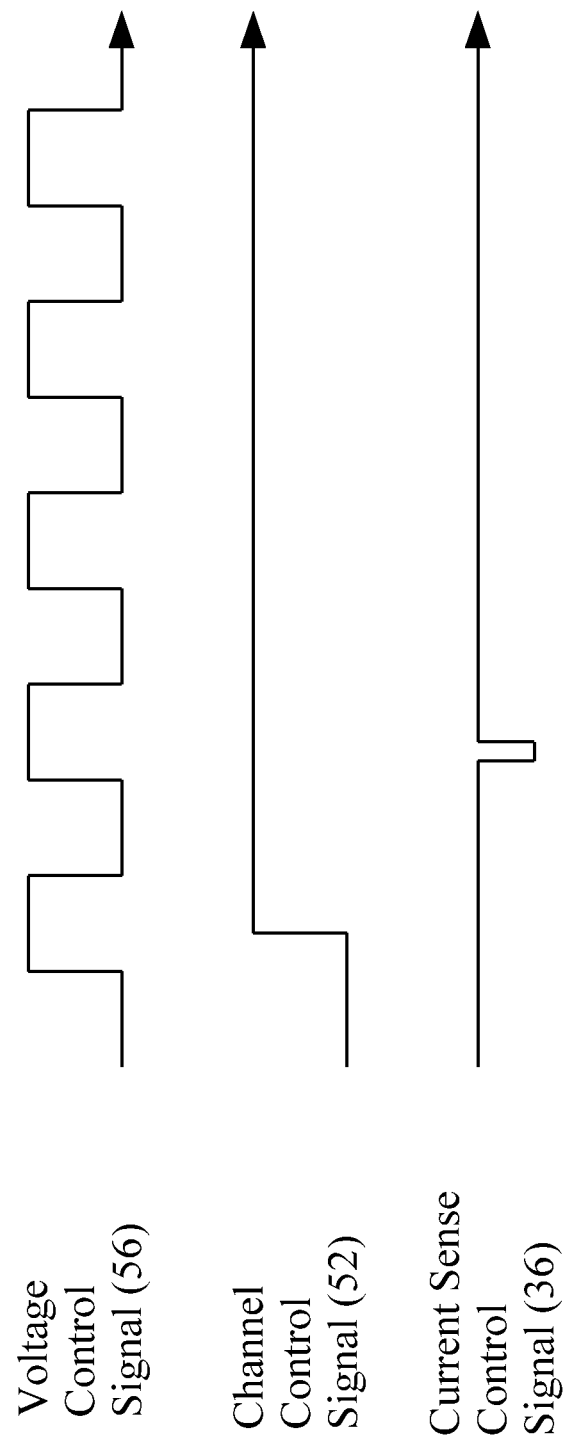
FIG. 5 is a timing diagram illustrating the relative timing of certain control signals used to estimate a sense current in an embodiment of the invention.

Control module 50 may also set current sense control signal 36 and voltage control signal 56 to ensure that current sense control signal 36 is only activated when current is flowing through current sense module 30 to ensure an accurate reading. A timing diagram illustrating one possible relationship between current sense control signal 36 and voltage control signal 56 to ensure an accurate measurement of the sense current 32 is illustrated in FIG. 5. Current sense control signal 36 may be maintained high so that switching element 112 is activated when the current sense voltage 34 is not being sampled. The current sense voltage 34 may only be sampled when voltage control signal 56 is high to allow a current to flow through switching element 108 into the current sense module 30.

It is also important to account for the impact of channel control signals 52 and 54 that provide PWM signals to activate switching elements 72 and 76 to selectively allow a current to flow through LED channels 70 and 74 in embodiments having switching elements 72 and 76. To obtain an accurate estimate of the average sense current 32, current sense voltage 34 may be sampled a number of times and then averaged so that the instantaneous current variations through LED channels 70 and 74 caused by the PWM channel control signals 52 and 54 do not result in an erroneous measurement. For example, current sense voltage 34 may be sampled 256 times a second and averaged to obtain an estimate of the current sense voltage 34 that may be used directly or used to calculate an average of the sense current 32 by control module 50. The current sense voltage 34 or sense current 32 may then be used to set the voltage control signal 56 (i.e. the duty cycle) to adjust the output voltage 20 going forward as part of a feedback control system. It should be noted that in certain embodiments, the output voltage is expected to undergo gradual changes as part of the feedback control system so taking a number of measurements of the current sense voltage 34 and averaging these measurements to increase accuracy may increase the overall effectiveness of the control system.

In certain embodiments, current sense voltage 34 may be sampled without knowledge of the timing or phase of channel control signals 52 and 54. A lookup table may then be used to obtain a more accurate estimation of the average current sense voltage 34 or sense current 32 based on the particular characteristics of the embodiment. For example, in certain embodiments, the current may be slightly higher shortly after the switching elements 72 and 76 have been activated to allow a current to flow. In this case, the measured current sense voltage 34 may be adjusted based on values stored in a lookup table to obtain a more accurate estimate of the current sense voltage 34.

Additionally, current sense control signal 36 may be set to ensure that the current sense voltage 34 is only sampled when in a relatively steady state to minimize the impact of transient variations in the sense current 32 in certain embodiments. This may be accomplished by activating control signal 36 some time after a transition in voltage control signal 56 causes buck converter 101 to change state to increase accuracy. For example, as shown in FIG. 5 the current sense control signal 36 transitions from high to low, where a measurement is taken, some time after the transition of voltage control signal 56.

Lighting apparatus 10 may also have LED channels 70 and 74 coupled between high voltage rail 16 and low voltage rail 18. Switching elements 72 and 76 may also be coupled in series with LED channels 70 and 74 between the high voltage rail 16 and low voltage rail 18 and function to regulate the current through LED channels 70 and 74 in response to channel control signals 52 and 54 as previously described with reference to FIG. 1. A voltage divider circuit may also be utilized to increase the voltage applied to switching element 72 when a high channel control signal 52 is applied. This may be important where the switching element is a n-channel MOSFET and the low voltage rail 18 has been increased above a reference ground to ensure a sufficient $V_{GS}$ is applied to activate the MOSFET and allow a current to flow. Switching element 76 may have a similar voltage divider to accomplish the same function. In other embodiments, a number of other LED channels (not shown) and corresponding switching elements (not shown) may also be coupled between high voltage rail 16 and low voltage rail 18. Further still, in certain embodiments only a subset of LED channels, or none of the LED channels, may include switching elements coupled in series between high voltage rail 16 and low voltage rail 18.

In addition, the relative timing of channel control signals 52 and 54 may also be controlled by control module 50 to limit the magnitude of instantaneous current fluctuations flowing through the voltage converter 14 and correspondingly LED channels 70 and 74. Having each of the LED channels connected between a common high voltage rail 16 and low voltage rail 18 may permit the instantaneous current fluctuations to be minimized compared to other architectures where LED channels are configured and controlled as completely independent blocks. For example, the total instantaneous current fluctuations from power supply 11 may be reduced in this configuration compared to an architecture where all different LED blocks are controlled independently and powered by a common power supply, such as that disclosed in U.S. Published Patent Application No. 2009/0134817 by Jurngwirth et al published May 28, 2009.

For example, rather than having channel control signals 52 and 54 transition at the same time from high to low and low to high, which would cause the current between both LED channels 70 and 74 to transition at the same time resulting in a relatively large fluctuation in the instantaneous current through both LED channels at the same time, channel control signals 52 and 54 may transition at staggered times. Alternatively, channel control signal 52 may transition from low to high at the same time that channel control signal 54 transitions from high to low to minimize the total current fluctuations through buck converter 101. In this way, the total instantaneous current fluctuations passing through voltage converter 14 may be minimized while maintaining the ability to control an aspect of the light output from lighting apparatus 10, such as, the intensity, the color, or the color temperature. Minimizing the total instantaneous current fluctuations may reduce the load on the power supply 11, input capacitor 13 and capacitor 104 and may extend the operational lifespan of lighting apparatus 10. Moreover, such a control schema may reduce the strain on capacitor 104 of buck converter 101, which may also permit a capacitor having a lower ripple current to be utilized, and mitigate against any perceived flicker of the light output from lighting apparatus 10. Further, efforts to minimize the instantaneous current fluctuations through the LED channels may also provide a more stable output voltage 20, which may provide an improved ability to control various aspects of the light output from lighting apparatus 10, for example, the intensity, color, or color temperature of the light output.

In other embodiments of the invention, suitable modification may be made to minimize the current fluctuations where more than the two LED channels are present and the LED channels are pulse width modulated. Further details of an algorithm that may be used to minimize the instantaneous current fluctuations for a varying number of LED channels are described in U.S. patent application Ser. No. 12/624,414 filed Nov. 24, 2009 by Briggs ("Briggs I"), published as U.S. Published Patent Application No. 2010/0127632 on May 20, 2010, and assigned to Arkalumen Inc. of Ottawa, Ontario, which is hereby incorporated by reference.

In certain embodiments, the intensity of the light output from both LED channels 70 and 74 may be controlled collectively by control module 50 via voltage control signal 56 provided to voltage converter 14 and the responsive changes to output voltage 20. For example, the duty cycle of voltage control signal 56 may be set by control module 50 to set the output voltage 20 from buck converter 101 based on a desired output (i.e. a dimming desired intensity, color, or color temperature that may be captured by an interface and communicated to control module 50) from the lighting apparatus 10 and the value of sense current 32. For example, the duty cycle of voltage control signal 56 may be reduced by control module 50 to cause a corresponding reduction in output voltage 20 from buck converter 101. As a result of the reduced output voltage 20, the total current $I_T$ passing through LED channels 70 and 74 will be reduced, causing a reduction in light output from both LED channels 70 and 74 and therefore the lighting apparatus 10. Similarly, the control module 50 may increase the duty cycle of control signal 56 to cause a corresponding increase in the output voltage 20 to increase the total current passing $I_T$ through LED channels 70 and 74 to increase the intensity of light output from same. In this manner, the intensity of the light output from lighting apparatus 10 may be controlled to permit dimming using a constant voltage power supply 11 without applying a PWM signal to each LED channel or the LED channels collectively. Instead, the current flowing through the LED channel (s) may be controlled by modifying the output voltage 20 from the voltage converter 14, which may be implemented as buck converter 101 in certain embodiments.

Control module 50 may use the current sense voltage 34 to estimate sense current 32 as part of a feedback control system to account for variations in the operating conditions (e.g. temperature) and aging of certain components. As the intensity of the light output from LED channels 70 and 74 is proportional to the sense current 32, voltage control signal 56 may be set and adjusted based on the sense current 32 to achieve the desired light output from lighting apparatus 10. Alternatively, a feed forward control system without feedback may be used in other embodiments, but may not be as robust and accurate as the feedback control system noted above.

The embodiment depicted in FIG. 2 may also be operated so that both the voltage converter 14 and switching elements 72 and 76 are utilized to control an aspect of the light output from LED channels 70 and 74 in certain embodiments. For example, the output voltage 20 (or total current $I_T$) from buck converter 101 may be set by the duty cycle of voltage control signal 56 to set the total current flowing through LED channels 70 and 74. In conjunction with this, the relative intensity of LED channels 70 and 74 may be set by the duty cycle of channel control signals 52 and 54 applied to switching elements 72 and 76. This control architecture may permit the relative intensity of LED channels 70 and 74 to be varied in addition to the overall intensity of light output from the lighting apparatus 10.

For example, in certain embodiments LED channel 70 may comprise a plurality of LEDs, at least of a subset of the LEDs having a first color or color temperature. Similarly, LED channel 74 may comprise a plurality of LEDs, at least of a subset of the LEDs having a second color or color temperature, different from the first color or color temperature. The relative intensity of the light output from LED channels 70 and 74 may be set, by setting the duty cycle of channel control signals 52 and 54 to vary the average current through LED channels 70 and 74. The color or color temperature of the light output from lighting apparatus 10 may then be varied by varying the relative intensity of the light output from LED channels 70 and 74. For example, consider an embodiment where LED channel 70 is comprised of at least a subset of LEDs having a cold color temperature and LED channel 74 is comprised of at least a subset of LEDs having a warm color temperature. If the relative intensity of LED channel 70 is increased compared to LED channel 74 the color temperature of the light output from lighting apparatus 10 may be perceived to be colder. In certain embodiments, the total intensity of light output from lighting apparatus 10 may be maintained as constant while permitting the color or color temperature to be varied by applying a corresponding decrease in the intensity of light output from LED channel 74 to compensate for any increased light output from LED channel 70. This may be accomplished by varying the duty cycles of channel control signals 52 and 54 appropriately and/or varying voltage control signal 56.

Similarly, the color of the light output from lighting apparatus 10 may be varied by setting the relative intensity of the light output from various LED channels. For example, in an embodiment having three LED channels, where one of the LED channels comprises red LEDs, one of the LED channels comprises green LEDs, and one of the LED channels comprises blue LEDs, the color of the light output from lighting apparatus 10 may be varied by setting the relative intensity of the three LED channels.

The ability to independently control the total current $I_T$ through all LED channels, via the voltage control signal 56 to set the output voltage 20, and the relative intensity of each LED channel, via the associated channel control signal, may offer improved performance and flexibility over existing control systems under certain conditions. For example, control module 50 may also be operated to mitigate against excessive instantaneous current fluctuations by setting voltage control signal 56 to set the total current and by setting channel control signals 52 and 54 to set the relative intensity of light output from each channel, which allows increased control of the light output from lighting apparatus 10. For instance, control module 50 may be operated to mitigate against excessive current fluctuations while permitting the color or color temperature to be set. Such a control architecture may overcome one or more limitations of, for example, the control system disclosed in U.S. Pat. No. 7,759,881 issued Jul. 20, 2010 to Melanson, for applications that require an adjustable color or color temperature.

More generally, the ability to set the total current $I_T$ through all LED channels via voltage control signal 56 provides an additional variable that may be utilized by control module 50 in an attempt to minimize instantaneous current fluctuations under certain operating conditions. Under certain operating conditions, control module 50 may be operated to maintain a constant total current (i.e. the current excluding transient variations and ripple, for example, ripple caused by the voltage converter) at the output of voltage converter 14 by setting voltage control signal 56 and channel control signals 52 and 54 appropriately.

For example, consider the case where the desired intensity of light output from lighting apparatus 10 is set to require 25% of the desired maximum total current (i.e. the average current that would provide 100% of the desired light output) or 25% of the desired maximum channel current (i.e. the average current that would provide 100% of the desired light output from the LED channel) from each of LED channels 70 and 74. Additionally, assume the desired color temperature is set to require LED channel 70, comprising at least a subset of LEDs having a cold color temperature, to be operated at 30% of the desired maximum channel current, and LED channel 74, comprising at least a subset of LEDs having a warm color temperature, to be operated at 20% of the desired maximum channel current. Where the total current $I_T$ is set to a percentage of the desired maximum total current (i.e. the scaled total current), the duty cycle applied to each LED channel (i.e. the scaled duty cycle) may be determined by dividing the duty cycle when operated at the desired maximum total current by the scaled total current. For example, where the total current $I_T$ is reduced to 50% of the desired maximum (i.e. the scaled total current is 0.5) the duty cycle applied to each LED channel (i.e. the scaled duty cycle) may be doubled (e.g. 1 divided by 0.5). Thus, in the above example, the scaled duty cycle applied to LED channel 70 may be 60% (30%/0.5) and the scaled duty cycle applied to LED channel 74 may be 40% (20%/0.5).

Figure 6:
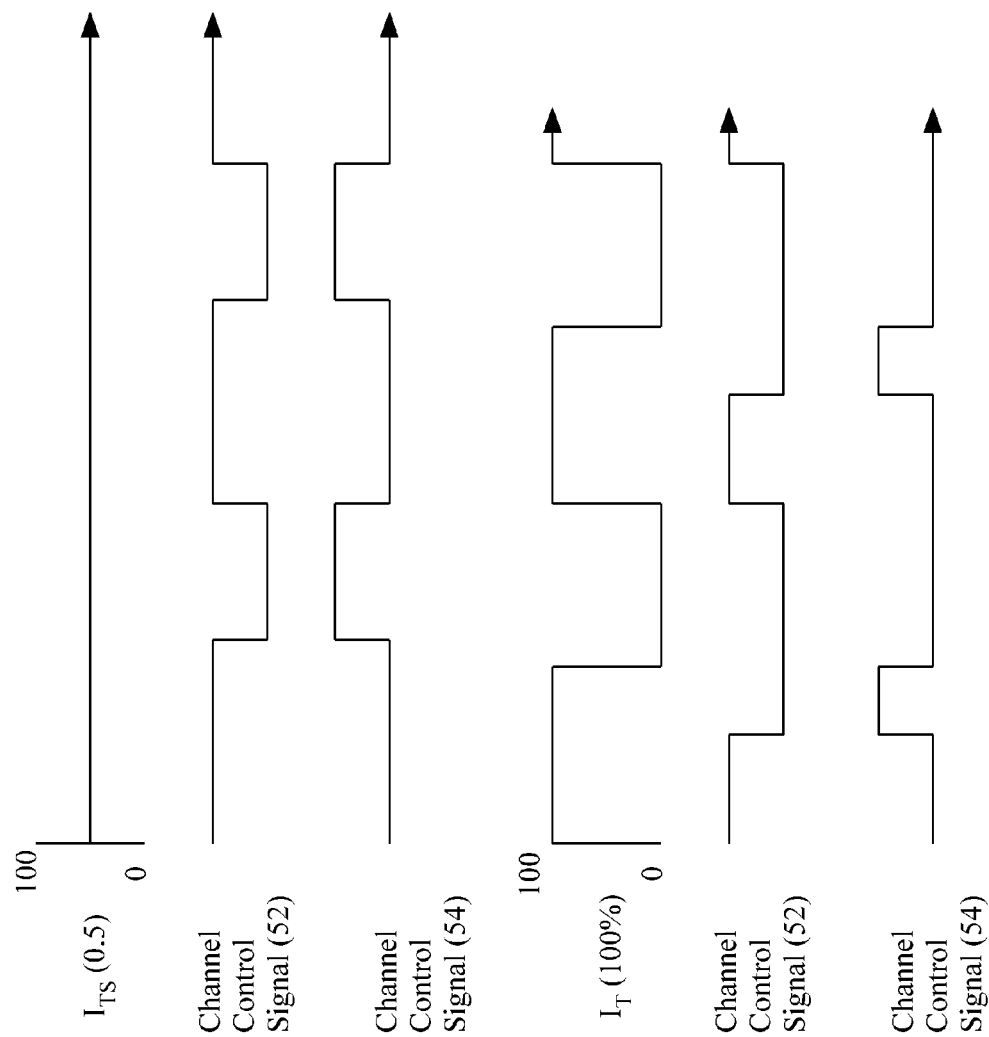
FIG. 6 is a timing diagram illustrating the relative timing of the channel control signals and total current in an embodiment of the invention.

An example of the channel control signals 52 and 54 and the total current $I_T$ are illustrated in FIG. 6 where the scaled total current is set to 50% of the desired maximum via the voltage control signal 56, channel control signal 52 is operated with a 60% duty cycle, and channel control signal 54 is operated with a 40% duty cycle. When the total current $I_T$ is 50% of the desired maximum total current (i.e. the scaled total current is 0.5), channel control signal 52 may be high for the first 60% of the period and then transition to low for the remaining 40% of the period. Channel control signal 54 may be low for the first 60% of the period and then transition to high for the last 40% of the period. The phase of channel control signal 52 may be zero and the phase of channel control signal 54 may be 0.6 in this example as the transition from low to high of channel control signal 54 is delayed by 60% of the period. This process may be repeated over a number of periods until it is desired to operate lighting apparatus 10 in a different state. As a result, the fluctuations in the total instantaneous current may be minimized and would ideally be zero, excluding non-ideal transient currents and ripple.

In contrast, assuming $I_T$ is operated at 100% of the desired maximum total current, channel control signal 52 would be operated at a duty cycle of 30% and channel control signal 54 would be operated at a duty cycle of 20%. As shown, in FIG. 6, even attempting to minimize the current variations, the total current variations are greater compared to the case where the total current $I_T$ is reduced to 50% of the desired maximum. In the case illustrated where the total current $I_T$ is reduced to 50% of the desired maximum total current, the total current at the output of the voltage converted is maintained at a constant current. A constant current as used herein, may refer to a current excluding transient variations, such as, the ripple caused by a voltage converter or transient switching currents. The ability to operate at a lower total current $I_T$ and minimize any current variations may increase the lifespan of lighting apparatus 10 and permit components having less stringent specifications to be used in certain implementations.

More generally, control module 50 may cause voltage converter 14 to maintain a constant current (total current) at the output of or through voltage converter 14 under certain operating conditions. For example, consider the operation of the embodiment depicted in FIG. 2 having two LED channels and where each of channel control signal has a duty cycle and a phase (i.e. a time delay or offset relative to other control signals). The control module 50 may maintain a constant total current at the output of voltage converter 14 when the sum of the duty cycles of channel control signals 52 and 54 is less than or equal to 1 when the total current is at the desired maximum total current (i.e. 100%).

Bearing in mind the above noted constraint, the duty cycle of voltage control signal 56 may be set to a scaled duty cycle so that a scaled total current at the output of voltage converter 14 is the sum of the duty cycles of channel control signals 52 and 54 when operating at the maximum desired current. A scaled total current may be considered a percentage of the desired maximum total current (e.g. 0.5). A scaled duty cycle of channel control signal 52 may then be determined by dividing the duty cycle of channel control signal 52 when operating at the maximum desired total current by the scaled total current. The phase of channel control signal 52 may also be set to the sum of the duty cycles of any previous channel control signals, which would be zero as channel control signal 52 may be considered the first channel. Similarly, a scaled duty cycle of channel control signal 54 may then be determined by dividing the duty cycle of channel control signal 54 when operating at the maximum total current by the scaled total current. The phase of channel control signal 54 may also be set to the sum of the scaled duty cycles of any previous channel control signals, which would be the scaled duty cycle of channel control signal 52 in this case. The above description may be stated mathematically, as follows:

$$I_{TS} = D_{1M} + D_{2M}$$

$$D_{1S} = \frac{D_{1M}}{I_{TS}} \quad D_{2S} = \frac{D_{2M}}{I_{TS}}$$

$$P_{1S} = 0 \quad P_{2S} = D_{1S}$$

Where:
$I_{TS}$ is the scaled total current;
$D_{NM}$ is the duty cycle of the Nth channel control signal when operating at a desired maximum total current;
$D_{NS}$ is the duty cycle of the Nth channel control signal when operating at the scaled total current; and
$P_{NS}$ is the phase of the Nth channel control signal when operating at the scaled total current.

For example, assume the duty cycle of channel control signal 52 ($D_{1M}$) is 0.3 and the duty cycle of channel control signal 54 ($D_{2M}$) is 0.6 when operating at the desired maximum total current. The scaled total current ($I_{TS}$) would be determined to be 0.9. The scaled duty cycle of channel control signal 52 ($D_{1S}$) would be determined to be ⅓ and the scaled duty cycle of channel control signal 54 ($D_{2S}$) would be determined to be ⅔. The phase of channel control signal 52 ($P_{1S}$) would be determined to be zero and the phase of channel control signal 54 ($P_{2S}$) would be determined to be ⅓. The total current passing through voltage converter 14 could be maintained at a constant total current by operating with a scaled total current of 0.9, having the channel control signal 52 activate LED channel 70 for the first ⅓ of the period and deactivate LED channel 70 for the remaining ⅔ of the period. Channel control signal 54 may cause LED channel 74 to be inactive for the first ⅓ of the period and active for the last ⅔ of the period, so that the phase of channel control signal 54 may be considered to be ⅓ and channel control signal may be offset relative to channel control signal 52.

Generally, control module 50 may be operable to determine the scaled total current, scaled duty cycles and phases of each channel control signal using the equations above through a process denoted mapping. Control module 50 may be operable to perform the calculations directly in certain embodiments. In other embodiments, where the processing capabilities of control module 50 are limited, a lookup table may be used. The lookup table may be loaded with the appropriate scaled values (i.e. the scaled total current, scaled duty cycles and phases for each control channel, etc.) and may be consulted for a variety of different operating conditions. In other embodiments, other methods of mapping or accounting for the limitations of control module 50 may be employed without departing from the scope of the invention.

The total current at the output of voltage converter 14 may also be maintained as a constant total current in embodiments having three or more LED channels under certain operating conditions. Specifically, control module 50 may maintain a constant total current at the output of voltage converter 14 when the sum of the duty cycles of the three channel control signals is less than or equal to 1 when the total current is at the desired maximum total current (i.e. 100%). The following equations, using the same references as noted above, may be used in an embodiment having three LED channels:

$$I_{TS} = D_{1M} + D_{2M} + D_{3M}$$

$$D_{1S} = \frac{D_{1M}}{I_{TS}} \quad D_{2S} = \frac{D_{2M}}{I_{TS}} \quad D_{3S} = \frac{D_{3M}}{I_{TS}}$$

$$P_{1S} = 0 \quad P_{2S} = D_{1S} \quad P_{3S} = D_{1S} + D_{2S}$$

Figure 9:
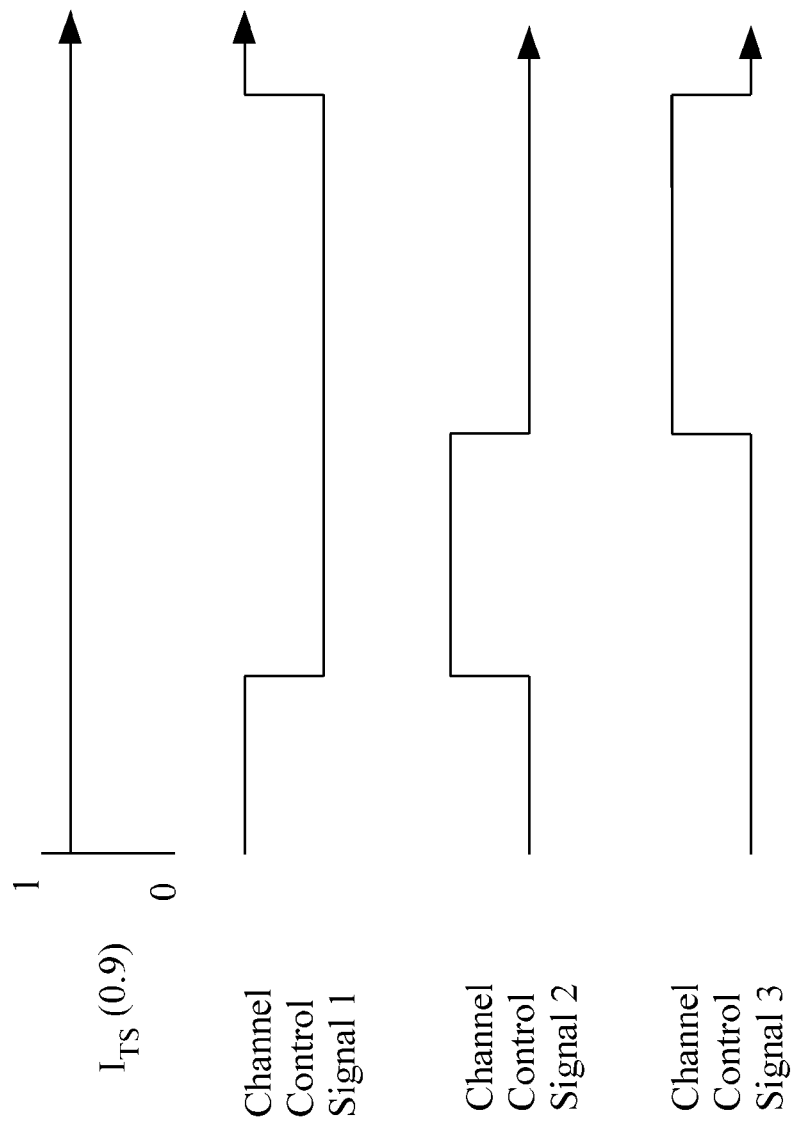
FIG. 9 is a timing diagram illustrating the relative timing of the channel control signals and total current in another embodiment of the invention having three LED channels.

An example of the various control signals in an embodiment having three LED channels is illustrated in FIG. 9. The duty cycles of the first, second, and third channel control signals may be 0.2, 0.3, and 0.4 respectively when operating at the desired maximum total current. The scaled total current may be determined to be 0.9 and the scaled duty cycles of the first, second, and third channel control signals may be determined to be ⅔, ⅜, and ⁴⁄₉ respectively. The phases of the first, second, and third channel control signals may be determined to be 0, 2/5, and 5/5 respectively. The various channel control signals may operate as depicted in FIG. 9 to maintain a constant total current through the voltage converter and may operate to reduce current fluctuations compared to operating the lighting apparatus at the desired maximum total current.

Figure 3:
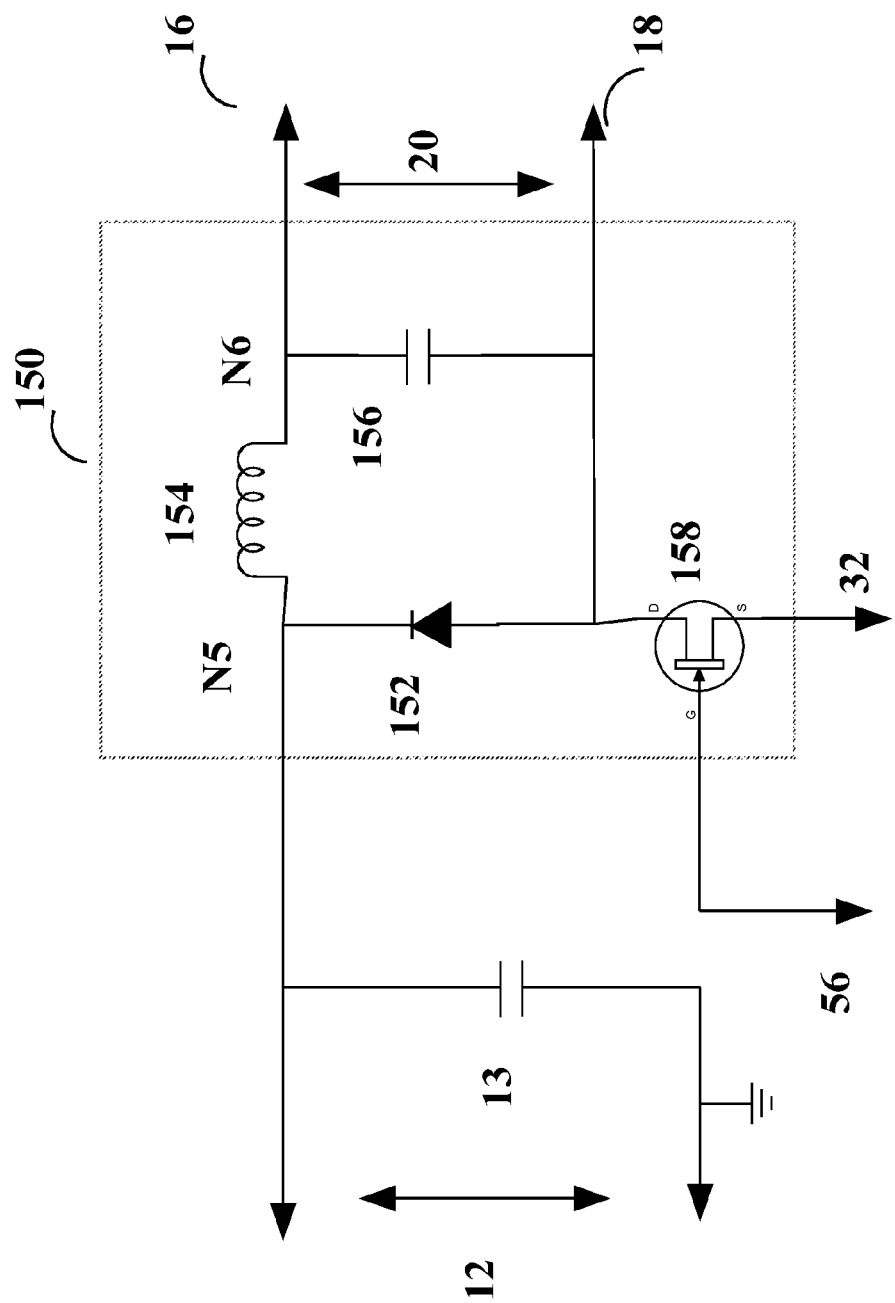
FIG. 3 is a schematic diagram of an alternative voltage converter design.

Voltage converter 14 may be implemented in a number of different configurations, for example, buck converter 150 as illustrated in FIG. 3. Buck converter 150 may be substituted for buck converter 101, acting as a voltage converter 14, as depicted in FIG. 2 with suitable modification. Buck converter 150 may be coupled to power supply 11 to receive input voltage 12. A diode 152 may be coupled between node N5 and low voltage rail 18 and biased to allow a current to flow from low voltage rail 18 to node N5. Inductor 154 may be coupled between nodes N5 and N6 and a capacitor may be coupled between node N6 and low voltage rail 18 as shown. A switching element 158, for example an n-channel MOSFET, may be coupled between low voltage rail 18 and a connection to provide a sense current 32 to current sense module 30 or a reference ground. Switching element 158 may be controlled via voltage control signal 56 provided by control module 50 in a similar manner to that previously described.

When switching element 156 is activated, from a previously inactive state, to allow a current to flow through it, a positive instantaneous voltage is created across inductor 154 between nodes N5 and N6 which causes the output voltage 20 to be reduced by reducing the voltage applied to high voltage rail 16 at the output of buck converter 150. In this state, inductor 154 is charging. Conversely, when switching element 156 is set to an inactive state from a previously active state, a negative instantaneous voltage is created across the inductor 154 between nodes N5 and N6, which may cause diode 152 to conduct a current and discharge inductor 154. Where voltage control signal 56 is operated as a PWM signal the voltage applied to the high voltage rail 16 and hence the output voltage 20 may be reduced relative to input voltage 12 in a manner known to persons skilled in the art. A lighting apparatus incorporating buck converter 150 may otherwise be operated in an analogous manner to that previously described with reference to buck converter 101.

Figure 4:
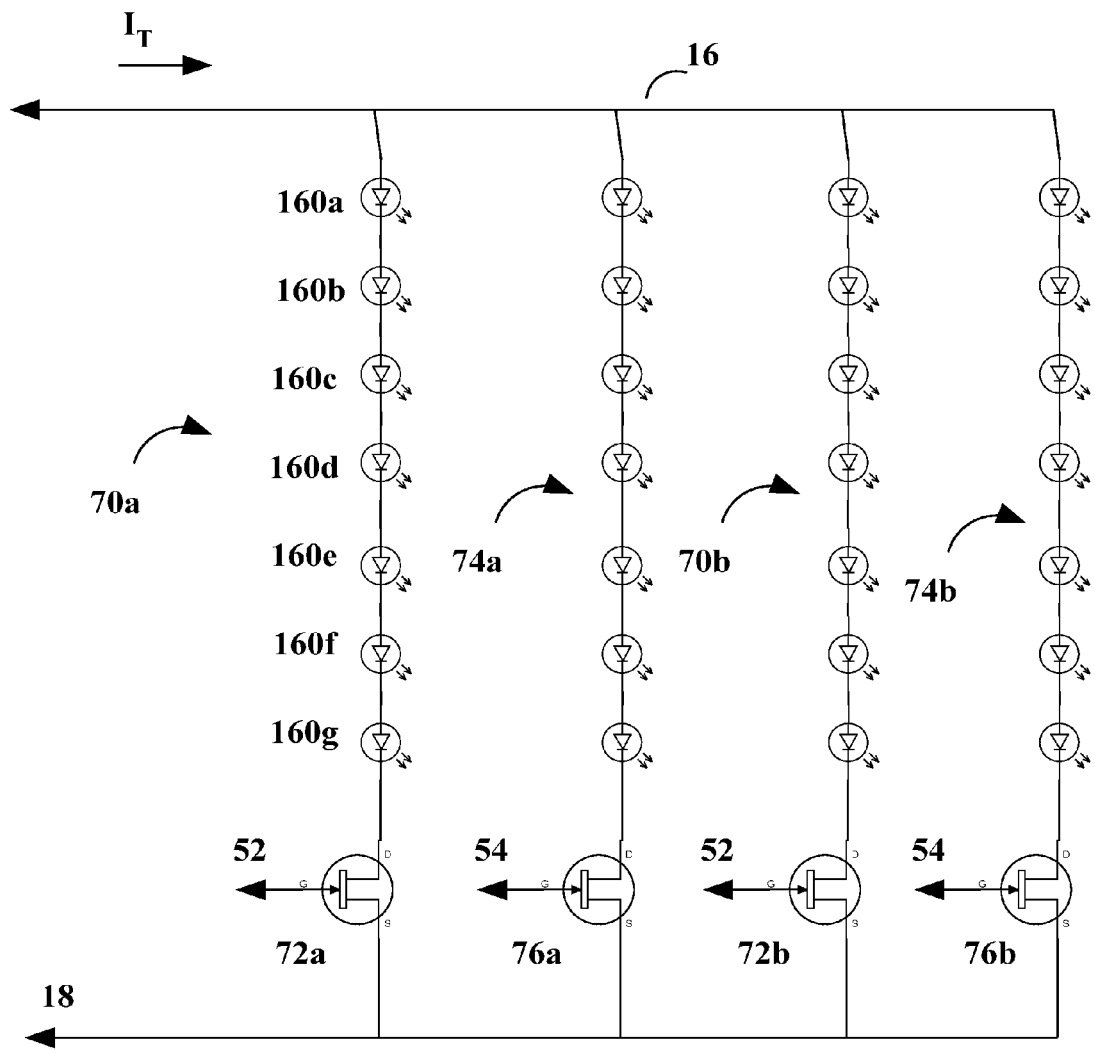
FIG. 4 is a schematic diagram illustrating an embodiment of the LED channels in greater detail.

Further details of an embodiment of LED channels 70 and 74 are illustrated in FIG. 4. LED channel 70 may be comprised of LED sets 70a and 70b coupled in parallel between high voltage rail 16 and low voltage rail 18. LED set 70a may be comprised of a plurality of LEDs 160a-160g and switching element 72a coupled in series. LED set 70b may be configured in a similar manner with a plurality of LEDs coupled in series with switching element 72b. Each of switching elements 72a and 72b may be coupled to channel control signal 52 so that LED sets 70a and 70b are controlled collectively as LED channel 70. Alternatively, a number of independent control signals may be operated collectively by control module 50 to achieve the same effect without departing from the scope of the invention. LED channel 70 may be comprised of a single LED, a single LED set, or at least two LED sets that are logically considered to be a single channel by control module 50 in various embodiments. LED channel 74 may comprise LED sets 74a and 74b that may be configured and controlled in a similar fashion.

In certain embodiments, for example, where LED channels 70 and 74 comprise at least a subset of LEDs having different colors or color temperatures the physical layout of the LED channels and LED sets may be material. For example, it may be desirable to position the LEDs of LED channels 70 and 74 in close proximity where at least a subset of the LEDs of channel 70 are of a first color or color temperature and at least a subset of the LEDs of channel 74 are of a different color or color temperature. Such a configuration may permit the light radiated by the respective LEDs of LED channels 70 and 74 (LED sets 70a, 70b, 74a, and 74b) having different properties to overlap (partially intersect) before reaching an optics portion (not shown) of lighting apparatus 10 to allow the color or color temperature of the light output to be perceived as relatively uniform by persons in the vicinity of the lighting apparatus.

Figure 7:
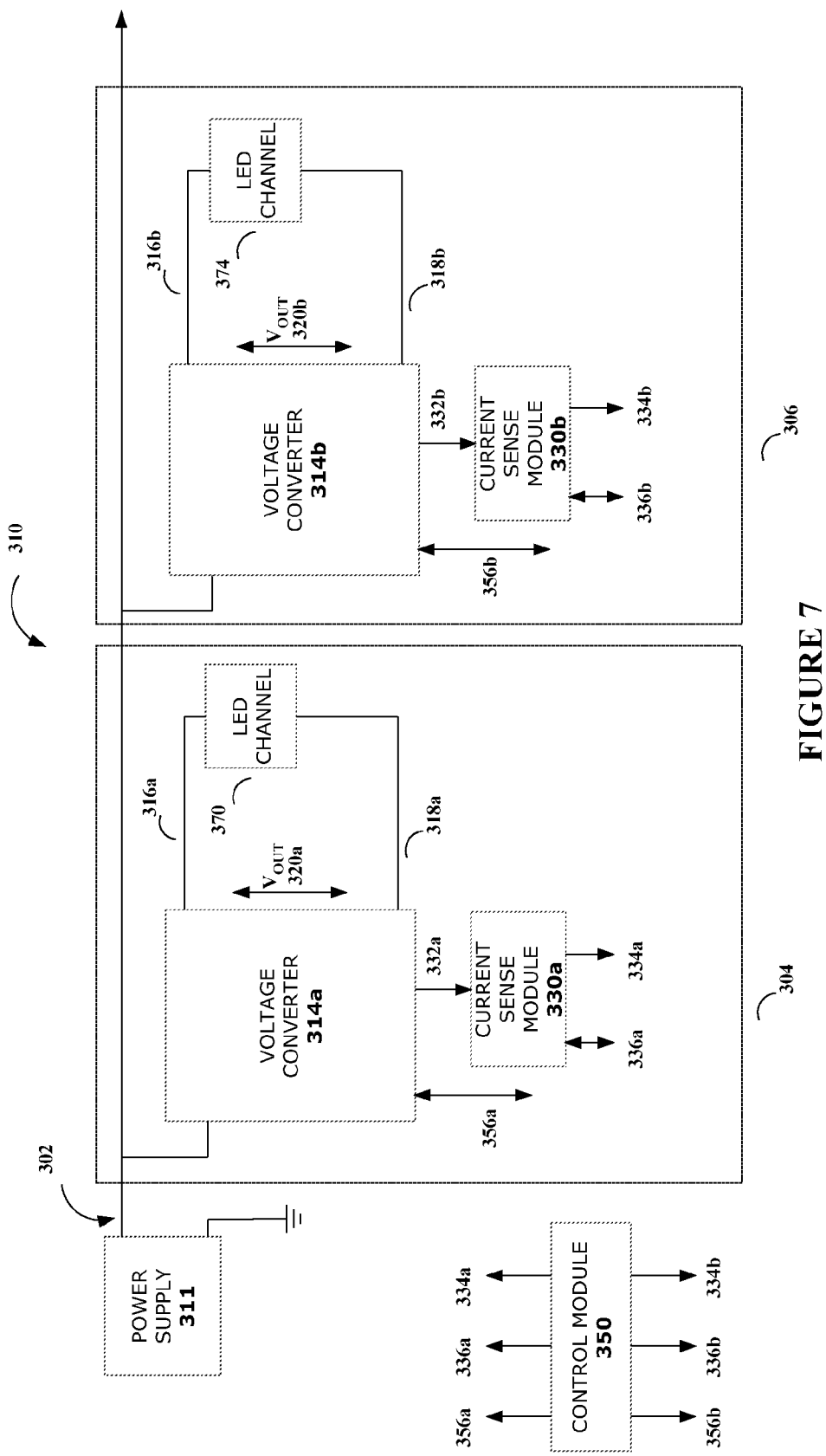
FIG. 7 is an architecture diagram of an embodiment of the invention having multiple voltage converters.

Other embodiments, such as lighting apparatus 310 depicted in FIG. 7, may employ a single power supply 311 to provide a source of power to at least two LED modules, for example, LED modules 304 and 306. Generally, lighting apparatus 310 and its components having the same element numbers may be considered to operate in the same manner as previously described. Similarly, components having element numbers that have been incremented by 300 and illustrated in FIGS. 7 and 8 may be assumed to operate in the same manner as the base element numbers. For example, LED channel 370 may be assumed to be configured and operate in the same manner as LED channel 70 unless otherwise apparent or specified.

LED modules 304 and 306 may each be coupled to a positive supply voltage 302 to couple LED modules 304 and 306 to power supply 311. Other LED modules (not shown) may also be included in lighting apparatus 310 and coupled to positive supply voltage 302. Power supply 311 may be a constant voltage power supply. Control module 350 may be coupled to voltage converters 314a and 314b and current sense modules 330a and 330b in LED modules 304 and 306 respectively.

LED module 304 may include a voltage converter 314a coupled to positive supply voltage 302. Voltage converter 314a may output an output voltage 320a defined between supply rail 316a and low voltage rail 318a. LED channel 370, which may be similar to the LED channels previously described, may be coupled between the supply rail 316a and low voltage rail 318 to allow a current to flow from supply rail 316a to low voltage rail 318. Current sense module 330a may be coupled to voltage converter 314a to receive a sense current 332a and generate a sense current voltage 334a that is proportional to the sense current 332a.

Control module 350 may exercise supervisory control over LED modules 304 and 306 and any other LED modules that may be present in lighting apparatus 310. For example, control module 350 may receive a current sense voltage 334a from current sense module 330a to provide an indication of sense current 332a. Control module 350 may provide a current sense voltage control signal 336a to current sense control module 330a to selectively alter the resistance of same as previously described. Similarly, control module 350 may provide a voltage control signal 356a to voltage converter 314a so that the output voltage 320a may be set at least partially based on the characteristics of voltage control signal 356a.

The intensity of light output from LED module 304 may be related to the output voltage 320a. The output voltage 320a at least partially defines the current that may flow through LED channel 370 and thus is related to the intensity of light emitted by LED channel 370. The intensity of light output from LED module 304 may therefore be set or varied by setting voltage control signal 356a to set the output voltage 320a and therefore the current flowing through LED channel 370. The intensity of light output from LED module 306 may be set in a similar manner by control module 350 via voltage control signal 356b. The ability of control module 350 to set the intensity of the light output from LED modules 304 and 306 allows the control module 350 to dim the intensity of the light output, possibly in response to a desired intensity level set on an interface (not shown).

Additionally, in embodiments where LED channel 370 has at least a subset of LEDs having a first color or color temperature and LED channel 374 has at least a subset of LEDs having a second color or color temperature that is different from the first color or color temperature, the color or color temperature of the light output from lighting apparatus 310 may be set by control module 350. For example, the color or color temperature of the light output from light apparatus 310 may be set by adjusting the relative intensity of the light output from LED modules 304 and 306 similar to that described above. Other aspects of the light output from lighting apparatus 310 may also be controlled by controlling the relative intensity of the light emitted from the constituent LED modules. In this manner, the total intensity of the light output, and other aspects of the light output including the color and color temperature of the light output may be varied in certain embodiments. As previously described, the relative physical layout of the LED modules comprising each of LED channels 370 and 374 may be important to optimize performance in embodiments where the color or color temperature may be varied. In simplified terms, LEDs having different properties may be positioned in close proximity to each other so that the light radiated from these LEDs may overlap before reaching an optics section (not shown) of lighting apparatus 310 according to methods known in the art.

Figure 8:
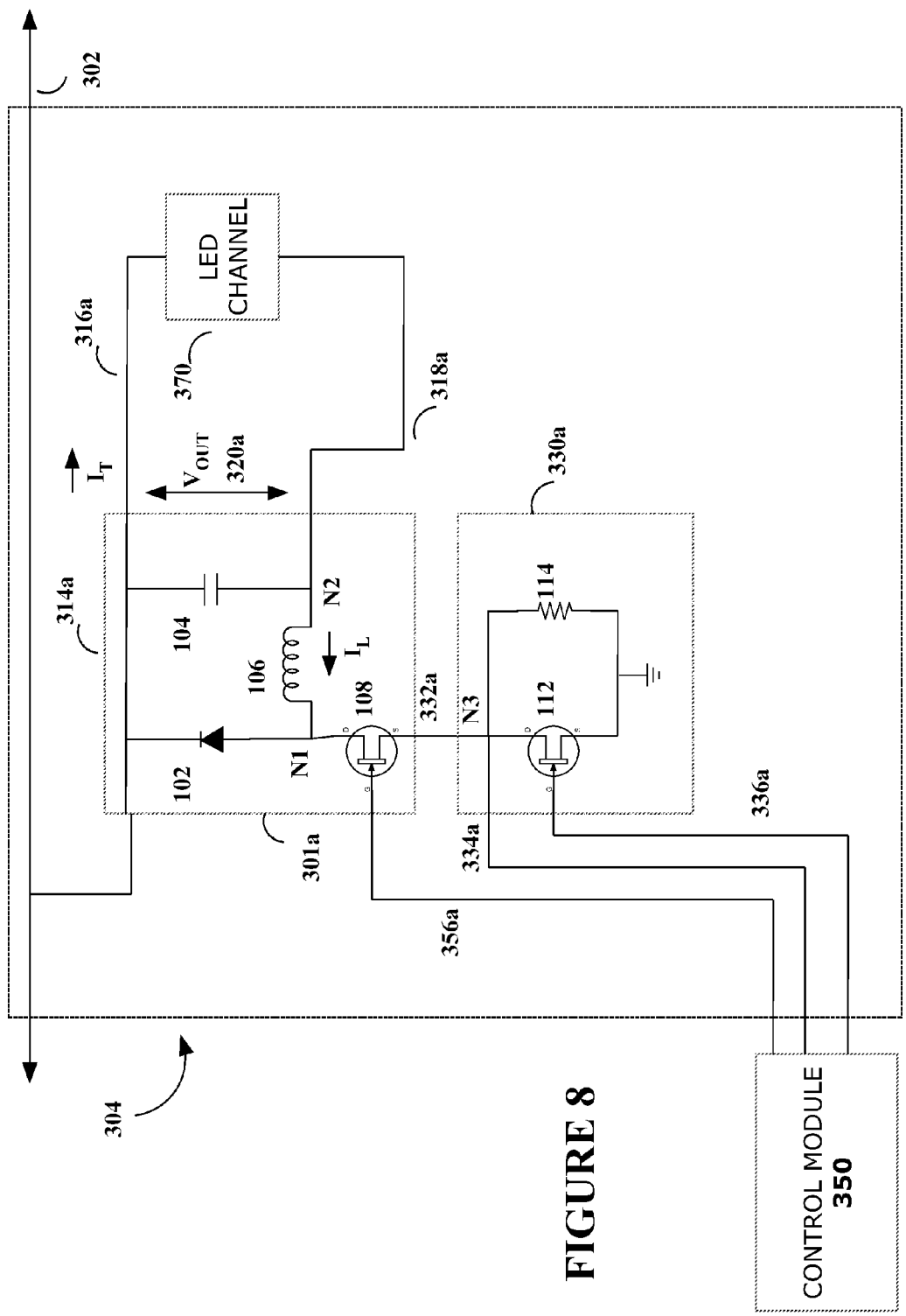
FIG. 8 is a schematic diagram showing parts of the embodiment illustrated in FIG. 7 in greater detail.

More generally, the control architecture disclosed in FIGS. 7 and 8 may limit instantaneous current fluctuations to acceptable levels while providing an increased degree of controllability over certain prior art control systems.

One possible embodiment of LED module 304 is shown in FIG. 8. Voltage converter 314a may be implemented as buck converter 301a and generate an output voltage 320a that may be less than positive supply voltage 302. Buck converter 301a may operate as previously described with reference to FIG. 2, so that the output voltage is increased when the duty cycle of voltage control signal 356a is increased and decreased when the duty cycle is decreased. In this manner, voltage control signal 356a may control the current through LED channel 370 and therefore control the intensity of the light emitted from LED channel 370. In this embodiment, the intensity of light emitted from LED channel 370 may only be set via the buck converter 301a as there is no additional switching element coupled to LED channel 370 to apply a pulse width modulated signal akin to that described with reference to FIG. 2.

Current sense module 330a may operate in a similar manner to that previously described, however, the sampling of the current may be simplified because the individual LED channels are not being pulse width modulated under the control of the channel control signals as previously described. The control module 350 may use the detected value of the current sense voltage 334a (or the related sense current 332a) as part of a feedback control system to assist in setting the duty cycle of voltage control signal 356a as previously described to set the intensity of light output from LED channel 370.

A further embodiment of the invention that may have a similar structure to the embodiments described above is discussed with reference to FIGS. 10A, 10B, and 11. More specifically, an embodiment of a particular control scheme is described with reference to FIGS. 10-11 that may be used with, for example, an apparatus having an architecture similar to the architecture described with reference to FIG. 1.

Figure 10A:
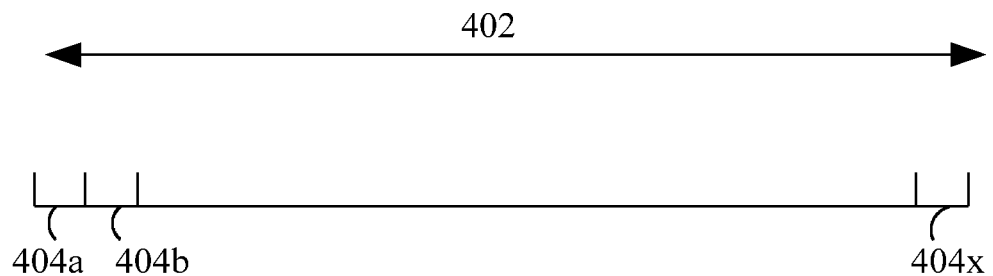
FIG. 10A is a diagram showing the relationship between a timing block and timing slots in an embodiment of the invention.
Figure 10B:
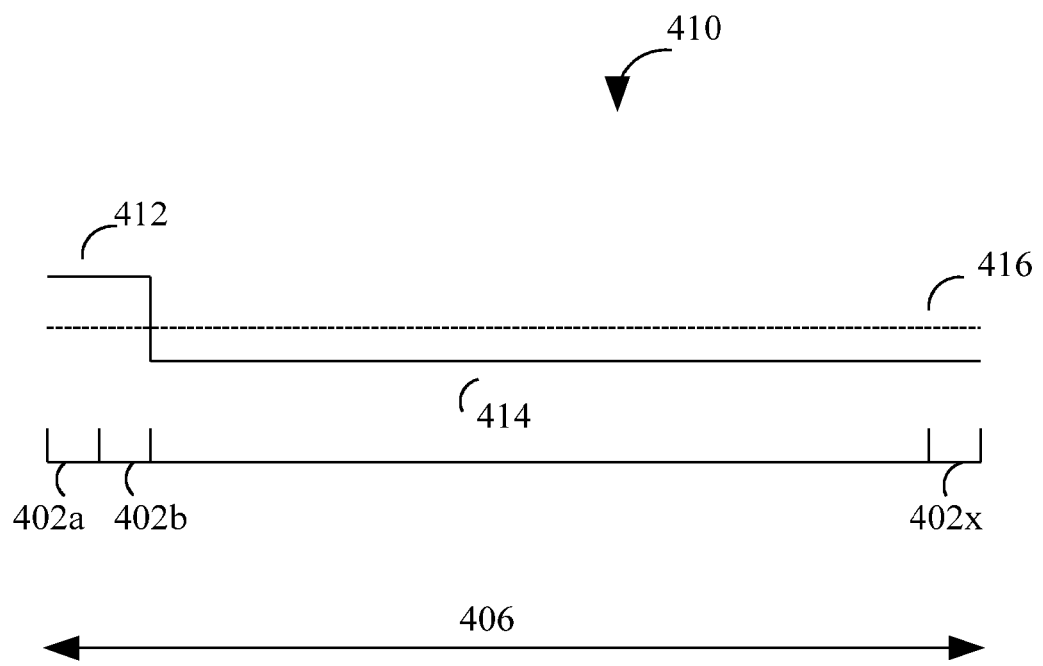
FIG. 10B is a diagram showing the relationship between a timing group and timing blocks in an embodiment of the invention.

An embodiment of a timing structure that may be used to control a lighting apparatus is shown in FIGS. 10A and 10B. A timing block 402 may be comprised of a number of slots 404, 404b, . . . , 404x, or a single slot in certain embodiments. The number of slots in each timing block may vary depending on the application and may be, for example, 16 slots per timing block. A timing group 406 may be comprised of a number of timing blocks 402a, 402b, . . . , 402x, with the number of timing blocks in each timing group varying on the particular application. For example, a timing group 406 may be comprised of 16 timing blocks 402a-402p (not all shown), with each timing block comprising 16 slots 404a-404p (not all shown).

In certain embodiments, the output voltage 20 from voltage converter 14 may be adjusted over a limited range, for example, between 21 and 24 Volts. As a consequence, it may be difficult to provide fine control when using relatively small numbers as control parameters because of a poor control resolution as part of the control system or control module 50. As a result, an incremental change in a control value may have a relatively large effect on the resultant output. Resolution as used herein may be understood to be the degree to which control module 50 may control the output parameters with a greater resolution being indicative of a control module 50 that may make finer (smaller) changes to the output variables. For example, an increase of single value of the duty cycle of voltage control signal 56 may cause a change in output voltage 20 from voltage converter 14 that may be larger than desired in certain applications.

An embodiment to provide increased control without simply using higher order control variables (i.e. larger variables) as part of control module 50 may be described with reference to FIG. 10B. A timing group 406 may be comprised of a number of timing blocks 402a, 402b, etc. and may repeat periodically. The duty cycle 410 of voltage control signal 56 may be a first value 412 for a first portion of timing group 406 and a second value 414 for a second portion of timing group 406. The timing group 406 may have a period referred to as a fine control period, so that the duty cycle 410 is set to a first value 412 for a first portion of fine control period and a second value 414 for a second portion of fine control period. The duty cycle 410 may have an average value 416 over the timing group 406 (fine control period) that may be between the first and second values 412 and 414 to provide a greater control resolution (i.e. increased fine control) of the average value 416 of duty cycle 410. For example, where timing group 406 is comprised of 16 timing blocks and the duty cycle 410 is set to a first value for the first 4 timing blocks and a second value for the remaining 12 timing blocks, the average value 416 may be calculated, as follows:

$$AverageValue = \frac{4 \times FirstValue + 12 \times SecondValue}{16}$$

The above equation is a weighted average and may be modified to account for different ratios of the first and second values 412 and 414 and varying numbers of timing blocks within timing group 406. More generally, the average value may be calculated according to the following equation:

$$AverageValue = \frac{a \times FirstValue + b \times SecondValue}{c}$$

Where:
- a is the number of timing blocks that the duty cycle is set to the first value 412;
- b is the number of timing blocks that the duty cycle is set to the second value 414; and
- c is the total number of timing blocks in timing group 406.

Alternatively, certain embodiments may be operated to set the duty cycle 410 of voltage control signal 56 to three or more values within a timing group 406. For example, the duty cycle may be set to a first value for a first number of timing blocks; a second value for a second number of timing blocks, and a third value for a third number of timing blocks within a timing group. In this example, the sum of the first, second, and third number of timing blocks may equal the total number of timing blocks within the timing group.

Such a control schema may permit finer adjustment of output voltage 20 from voltage converter 14 improving the performance of lighting apparatus 10 in certain applications. However, there are design factors that should be accounted for to ensure adequate performance. In order to provide an average value 416 that is between the first value 412 and second value 414, the duty cycle should be switched between the first and second values 412 and 414 relatively frequently and first and second values 412 and 414 should have relatively similar magnitudes. It may be advantageous to limit first and second values 412 and 414 of duty cycle 410 to adjacent values in certain applications. Where the absolute value of the difference between first and second values is one, the first and second values may be considered to be adjacent. Switching between the first and second values 412 and 414 at a relatively high frequency increases the likelihood of obtaining a relatively stable average value 416 instead of a stepwise output that may result if the duty cycle 410 is not switched between first and second values quickly enough. The particular values that are suitable for a particular application may vary depending on the design of the voltage converter 14 that may be used. For example, where voltage converter 14 is implemented as buck converter 101, the length of timing block 406 (i.e. the fine control period) and number of timing blocks 402 that duty cycle 410 is set to a first value 412 (a timing blocks) and a second value 414 (b timing blocks) may be dependent on the properties of capacitor 104 (FIG. 2).

The fine control architecture described above may be considered a three-tiered architecture having a timing group 406 comprised of at least two timing blocks 402, which in turn are comprised of at least two timing slots 404. Alternatively, a two-tiered fine control architecture may also be employed to achieve a similar result. For example, where each timing block 404 is comprised of a single timing slot 404, the timing slot 404 becomes superfluous, and the fine control architecture may be considered to be two-tiered and operate in the same manner as described above. In operation, the duty cycle 410 of voltage control signal 56 may be set to a first value 412 for a first number of timing blocks and to a second value 414 for a second number of timing blocks of timing group 406 to result in an average value 416 that is between first and second values 412 and 414. In certain embodiments, the sum of the first and second number of timing blocks may equal the total number of timing blocks within timing group 406.

Figure 11:
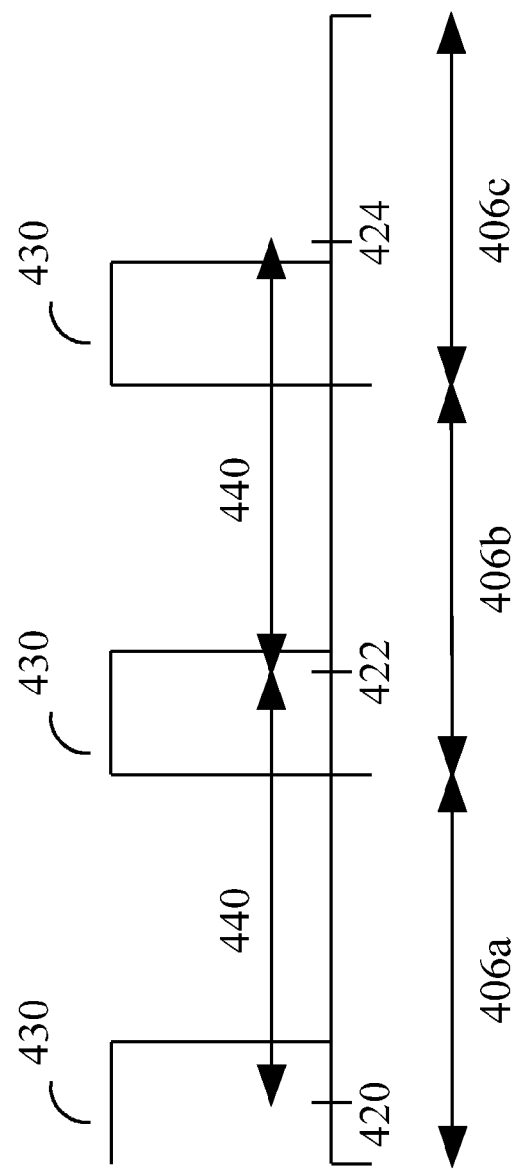
FIG. 11 is a timing diagram showing the relationship between various timing and control signals in an embodiment of the invention.

The relationship of certain control signals over time is shown in FIG. 11. For illustration, timing groups 406a, 406b, and 406c are shown. Each timing group may be comprised of a number of timing blocks and each timing block may be comprised of a number of timing slots in certain embodiments. Other timing architectures may also be used, for example, a timing scheme that does not employ individual timing slots in certain embodiments. Channel control signal 430 may be used to selectively allow a current to flow through an associated LED channel. For example, channel control signal 430 may be akin to channel control signal 52 in FIG. 1 that may be used to selectively allow a current to flow through LED channel 72. Channel control signal 430 may have a period equal to the period or length of timing group 406, which may be referred to as the channel control period, and a duty cycle that may be varied by control module 50 to vary the average current through the associated LED channel akin to that described above.

Control module 50 may be operable to receive an indication of the voltage converter current, namely the current passing through voltage converter 14. For example, control module 50 may sample, or receive an indication, of the voltage converter current periodically after a sampling period or interval. The sampling period 440 may be chosen to be different from the period or length of timing group 406 (i.e. fine control period). In this manner, samples of the voltage converter current may be taken at different points in time or different slots of successive timing groups 406a, 406b, etc. to provide a more representative sample of the variations that occur within each timing group 406 to increase the accuracy of the sample received by control module 50. For example, control module 50 may receive (sample) an indication of the voltage converter current in: slot 420 in timing group 406a; slot 422 in timing group 406b; and slot 424 in timing group 406c. For clarity, slots 420, 422, and 424 are at different positions within their respective timing groups 406a, 406b, and 406c respectively. For example, slot 420 may be in slot 25 of 256 in timing group 406a, slot 422 may be in slot 26 of 256 in timing group 406b, and slot 424 may be in slot 27 of 256 in timing group 406c. Alternatively, where sampling period 440 is less than the length or period of the timing group 406, the slot in which a sample is taken may decrease over successive samples until it resets at the highest slot of timing group 406. The samples taken in slots 420 and 422 may represent a voltage converter current taken when channel control signal 430 is set to allow a current to flow through the associated LED channel resulting in a non-zero current. In contrast, the sample taken in slot 424 may indicate that the channel control current is zero because channel control signal 430 prevents a current from flowing through the associated LED channel at that time. For the reasons noted above, samples should be taken when channel control signal 56 provided to voltage converter 14 is set to allow a current to flow through voltage converter 14 to current sense module 30 to ensure a more accurate reading.

In one particular implementation, a timing group 406 may be comprised of 16 timing blocks each having 16 slots so that each timing group 406 is comprised of 256 slots. In this case, the timing group may be considered to have a period or length of 256. The sampling period or sampling interval used by control module 50 may be set to be 255 so that the voltage converter current is sampled in a different slot in successive timing blocks. Alternatively, the sampling period 440 may be set to another value not equal to the period of the timing group 406. The samples may then be averaged over a number of timing blocks in an attempt to obtain a representative sample of the average operating conditions over time. Other numbers of timing slots and timing blocks may be used in other embodiments without departing from the scope of the invention.

Additionally, certain embodiments may employ a compensation algorithm to account for different values of the voltage control signal 56, for example, a different duty cycle or frequency, during a timing block 402. For example, control module 50 may account for the present value of the duty cycle 410 when receiving an indication of the voltage converter current (i.e. the current flowing through the voltage converter). For example, control module may wish to increase or decrease the received (sampled) indication of the current through the voltage converter 14 depending on whether the duty cycle 410 is a first value 412 or second value 414 at the time the indication of the current through voltage converter 14 is sampled or received during timing block 406.

Other sampling schemes that attempt to sample the voltage converter current at different slots of successive timing groups in an attempt to obtain a representative average value of the voltage converter current over the timing group may also be used with departing from the invention.

Another embodiment of the invention may have an architecture similar to that illustrated in FIG. 1 that may include a single LED channel (e.g. LED channel 70), two LED channels as shown in FIG. 1 (e.g. LED channels 70 and 72), or more than two LED channels. This particular embodiment may define the relationship between voltage control signal 56 provided to voltage converter 14 and any channel control signals (e.g. 52 and 54) that may control the current through one or more LED channels (e.g. 70 and 74). Specifically, voltage control signal 56 and channel control signals 52 and 54 may be synchronized to commence or begin their periods at the same point in time. Additionally, the relationship between the periods of channel control signals 52 and 54 and voltage control signal 56 may be defined so that the period of the channel control signals 52 and 54 is a multiple of the voltage control signal 56. As used herein, a multiple may be understood to result in a whole number without a fractional or decimal component. For example, where the period of the channel control signals 52 and 54 is $\frac{1}{400}$ s (corresponding to a frequency of 400 Hz), the voltage control signal 56 may be set to have a period of $\frac{1}{40000}$ s (corresponding to 40 kHz) so that the channel control signals 52 and 54 have a period that is a multiple of 100 times the voltage control signal 56. Similarly, a single channel control signal may be synchronized to commence at the same point in time as a voltage control signal and have a period that is a multiple of the voltage control signal in embodiments having a single LED channel. Again, suitable modifications may be made where more than two LED channels are present in an embodiment by synchronizing the various channel control signals and voltage control signal and defining them to have related periods as described above.

Synchronizing the various control signals noted above may improve performance by reducing flicker in the light output from lighting apparatus 10 under certain operating conditions compared to embodiments that do not synchronize the channel control signals and voltage control signals and define the channel control signals to be a multiple of the voltage control signal.

A further embodiment of the invention may have a structure similar to that shown in FIG. 1 but may operate in two different modes depending on the duty cycles of channel control signals 52 and 54 or the voltage converter current (i.e. the current flowing through voltage converter 14). For example, when the duty cycle of channel control signal 52 plus the duty cycle of channel control signal 54 (i.e. the combined duty cycle) is above a certain threshold value, control module 50 may set or adjust the parameters of voltage control signal 56, for example, the duty cycle of voltage control signal 56. By setting the parameters of voltage control signal 56, control module 50 may cause the total current $I_T$ (FIG. 2) provided at the output of voltage converter 14 to be maintained at a certain level when current is permitted to flow through the LED channels coupled to the output of voltage converter 14, for example, LED channels 70 and 74. Consequently, control module 50 may compensate for changes to the current voltage relationship (IV curve) of the LEDs that comprise the attached LED channels that may result from, for example, a temperature increase as a result of the operation of the LED channels or environmental factors. Control module 50 may maintain the parameters of voltage control signal 56 as constant if the duty cycle of channel control signal 52 plus the duty cycle of channel control signal 54 (i.e. the combined duty cycle) is below a certain threshold.

Other embodiments having a single LED channel or three or more LED channels coupled to a voltage converter may also be operated in two modes in a similar manner. For embodiments having a single LED channel, control module 50 may set the parameters of voltage control signal 56 when the duty cycle of the channel control signal exceeds a certain threshold and maintain the voltage control signal 56 where the duty cycle is below the threshold. Similarly, for embodiments having three or more LED channels, control module 50 may set the parameters of voltage control signal 56 when a metric based on the duty cycles of the channel control signals exceeds a certain threshold and maintain the voltage control signal 56 when said metric is below the threshold. The metric may be based on the sum of the duty cycles of the channel control signals in certain embodiments, although other metrics may also be used without departing from the scope of the invention.

With reference to FIG. 1, control module 50 may operate in a state where the duty cycle of channel control signal 52 plus the duty cycle of channel signal 54 is less than a threshold, so that control module 50 may maintain the parameters of voltage control signal 56 to maintain a relatively constant output voltage 20 at the output of voltage converter 14. The threshold may be expressed as a percentage akin to a duty cycle and may vary depending on the specific application. For example, where the duty cycle of channel control signal 52 is 15% and the duty cycle of channel control signal 54 is 20%, the combined duty cycle is 35%. In embodiments where the threshold is set to be 50%, control module 50 may maintain the parameters of voltage control signal 56 under these operating conditions since the combined duty cycle of 35% is less than the 50% threshold. If the combined duty cycle is, for example, 60%, control module 50% may set the voltage control signal 56 to modify the output voltage 20 because the 60% combined duty cycle exceeds the threshold. As described above, output voltage 20 may be varied by varying the duty cycle of voltage control signal 56.

By maintaining the parameters of voltage control signal 56 as constant when the duty cycle of channel control signal 52 plus the duty cycle of channel control signal 54 is below a certain threshold, control module 50 may increase the performance of the lighting apparatus 10 because the samples may not be sufficiently reliable when the combined duty cycle is below the threshold value. In this case, LED channels 70 and 74 may be pulse width modulated by control module 50 via the duty cycles of channel control signals 52 and 54 as described above, however, the voltage control signal 56 may be maintained as constant until the combined duty cycle or another metric exceeds the threshold. When lighting apparatus 10 is operated below the threshold, the expected temperature variation introduced by the operation of the LEDs may not be significant in certain applications and may not need to be controlled to prevent an excess current state that may damage or reduce the operating life of certain components of lighting apparatus 10.

In certain other alternative embodiments, control module 50 may also operate in two different modes depending on the current sense voltage 34, which is related to the voltage converter current (i.e. the current through voltage converter 14), rather than a metric based upon the duty cycle of the channel control signal or channel control signals where multiple LED channels are utilized. Control module 50 may receive an indication of the voltage converter current at periodic intervals and act responsively based on the value of the voltage converter current relative to the threshold value. For example, control module 50 may cause current sense module 30 to provide current sense voltage 34 to control module 50 responsive to current sense control signal 36 to provide an indication of the voltage converter current as described above. Where the indication of the voltage converter current received by control module 50 exceeds the threshold, control module 50 may set the parameters of voltage control signal 56 (e.g. the duty cycle) to adjust output voltage 20 from voltage converter 14. Similarly, where the indication of the voltage converter current is below the threshold, control module 50 may maintain the voltage control signal to operate in a similar manner to that described above using duty cycles of the various channel control signals.

Alternatively, control module 50 may operate in different modes based upon a desired intensity of light output from lighting apparatus 10. When the desired light output is set above a threshold value, control module 50 may periodically receive an indication of the voltage converter current and set or modify the voltage control signal 56 appropriately to maintain a desired instantaneous on-state current $I_T$. Similarly, when the desired intensity of light output is set below the threshold value, the control module may maintain the parameters of voltage control signal 56 as constant after a steady state has been reached to reduce the likelihood of any sampling error impacting the performance of lighting apparatus 10.

In some embodiments of the present invention a further step may be performed by the control module 50 to ensure that the setting of the voltage control signal 56 results in the desired voltage converter current output from the voltage converter 14. In some cases, the control module 50 may determine directly or indirectly the approximate voltage output from the voltage converter 14 in operation and then compensate for the approximate voltage output in setting the voltage control signal 56. The voltage output from the voltage converter 14 in operation, due to the current feedback system of the present invention, will be dictated by the forward voltages of the LEDs within the LED channels along with other resistances. In one embodiment of the present invention, the control module 50 may determine the voltage output by the voltage converter 14 directly by measuring the voltage between the high voltage rail 16 and low voltage rail 18. In another embodiment, the control module 50 may determine the approximate voltage output by the voltage converter 14 in operation using the initially calculated duty cycle of the voltage control signal 56 as a reference, this initially calculated duty cycle being an indirect indication of the approximate voltage output by the voltage converter 14. Based on the determined approximate voltage output from the voltage converter 14, the control module 50 may perform a look-up to determine an offset to apply to the duty cycle of the voltage control signal. This offset may adjust for variances in the current measured using the current sense module 30 based on variances in the forward voltages of the LEDs and allow for relatively constant voltage converter current levels across a range of forward voltages of the LEDs in the LED channels.

A number of embodiments have been described above and should not be considered to be mutually exclusive. Where appropriate, the various features and functionality described above may be combined in certain applications and should be considered to be within the scope of the invention described herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A control apparatus for a lighting apparatus, the control apparatus comprising:
   a voltage converter operable to generate an output voltage defined between a high voltage rail and a low voltage rail coupled to the output of the voltage converter, the output voltage based at least partially on a voltage control signal received by the voltage converter, the voltage control signal being high for one or more time slots and low for one or more time slots within each of a plurality of timing blocks within a fine control period; and
   a control module operable to:
      set a duty cycle of the voltage control signal to a first value for one or more first timing blocks of the fine control period, wherein the voltage control signal is high for a first number of time slots within each of the first timing blocks; and
      set the duty cycle of the voltage control signal to a second value for one or more second timing blocks of the fine control period, wherein the voltage control signal is high for a second number of time slots within each of the second timing blocks, the second number being different than the first number;
   wherein the first number of time slots within each of the first timing blocks and the second number of timing slots within each of the second timing blocks have similar relative magnitudes, whereby the duty cycle across the fine control period has an average value between the first and second values to provide an increased resolution to control the output voltage from the voltage converter.

2. The control apparatus according to claim 1, wherein an absolute value of the difference between the first number of time slots and the second number of time slots is one.

3. The control apparatus according to claim 1, further comprising:

a first LED channel coupled between the high voltage rail and the low voltage rail, the first LED channel comprising one or more first LEDs and a first switching element coupled in series between the high voltage rail and the low voltage rail, the switching element operable to selectively allow a current to flow through the first LED channel based on a first channel control signal; and the control module is further operable to provide the first channel control signal to the first switching element and to set a duty cycle of the first channel control signal to set the intensity of light emitted from the first LED channel.

4. The control apparatus according to claim 3, further comprising:

a second LED channel coupled in parallel with the first LED channel between the high voltage rail and the low voltage rail, the second LED channel comprising one or more second LEDs and a second switching element coupled in series between the high voltage rail and the low voltage rail, the second switching element operable to selectively allow a current to flow through the second LED channel based on a second channel control signal; and the control module is further operable to provide the second channel control signal to the second switching element and to set a duty cycle of the second channel control signal to set the intensity of light emitted from the second LED channel.

5. The control apparatus according to claim 1, wherein the voltage converter is a buck converter operable to set the output voltage by increasing the voltage on the low voltage rail based at least partially on the duty cycle of the voltage control signal.

6. A method of operating a lighting apparatus, the lighting apparatus comprising a voltage converter operable to generate an output voltage based at least partially on a voltage control signal received by the voltage converter, the voltage control signal being high for one or more time slots and low for one or more time slots within each of a plurality of timing blocks within a fine control period, the method comprising:

setting a duty cycle of the voltage control signal to a first value for one or more first timing blocks of the fine control period, wherein the voltage control signal is high for a first number of time slots within each of the first timing blocks; and setting the duty cycle of the voltage control signal to a second value for one or more second timing blocks of the fine control period, wherein the voltage control signal is high for a second number of time slots within each of the second timing blocks, the second number being different than the first number;

wherein the first number of time slots within each of the first timing blocks and the second number of timing slots within each of the second timing blocks have similar relative magnitudes, whereby the duty cycle across the fine control period has an average value between the first and second values to provide an increased resolution to control the output voltage from the voltage converter.

7. The method according to claim 6, wherein the absolute value of the difference between the first number of time slots and the second number of time slots is one.

8. The control apparatus according to claim 1, wherein the number of timing slots within each of the first and second timing blocks is at least 16 and wherein an absolute value of the difference between the first number of time slots and the second number of time slots is one.

9. The control apparatus according to claim 1, wherein the control module is operable to switch between setting the duty cycle of the voltage control signal to the first value and setting the duty cycle of the voltage control signal to the second value at a frequency to maintain stability of the average value between the first and second values across the fine control period.

10. The method according to claim 6, wherein the number of timing slots within each of the first and second timing blocks is at least 16 and wherein an absolute value of the difference between the first number of time slots and the second number of time slots is one.

11. The method according to claim 6, wherein setting the duty cycle of the voltage control signal to the first value and setting the duty cycle of the voltage control signal to the second value is switched at a frequency to maintain stability of the average value between the first and second values across the fine control period.

12. A lighting apparatus comprising:

a voltage converter operable to generate an output voltage defined between a high voltage rail and a low voltage rail coupled to the output of the voltage converter, the output voltage based at least partially on a voltage control signal received by the voltage converter, the voltage control signal being high for one or more time slots and low for one or more time slots within each of a plurality of timing blocks within a fine control period;

at least one first LED channel coupled between the high voltage rail and the low voltage rail, the at least one first LED channel comprising one or more LEDs coupled in series; and a control module operable to:

set a duty cycle of the voltage control signal to a first value for one or more first timing blocks of the fine control period, wherein the voltage control signal is high for a first number of time slots within each of the first timing blocks; and set the duty cycle of the voltage control signal to a second value for one or more second timing blocks of the fine control period, wherein the voltage control signal is high for a second number of time slots within each of the second timing blocks, the second number being different than the first number;

wherein the first number of time slots within each of the first timing blocks and the second number of timing slots within each of the second timing blocks have similar relative magnitudes, whereby the duty cycle across the fine control period has an average value between the first and second values to provide an increased resolution to control the output voltage from the voltage converter.

13. The lighting apparatus according to claim 12, further comprising a first switching element coupled in series with the first LED channel between the high voltage rail and the low voltage rail, the first switching element operable to selectively allow a current to flow through the first LED channel based on a first channel control signal; and the control module is further operable to provide the first channel control signal to the first switching element and to set a duty cycle of the first channel control signal to set the intensity of light emitted from the first LED channel.

14. The lighting apparatus according to claim 13, further comprising: a second LED channel and a second switching element coupled in series and together coupled in parallel with the first LED channel between the high voltage rail and the low voltage rail, the second switching element operable to selectively allow a current to flow through the second LED channel based on a second channel control signal; and the control module is further operable to provide the second channel control signal to the second switching element and to set a duty cycle of the second channel control signal to set the intensity of light emitted from the second LED channel.

15. The lighting apparatus according to claim 12, wherein an absolute value of the difference between the first number of time slots and the second number of time slots is one.

16. The lighting apparatus according to claim 12, wherein the number of timing slots within each of the first and second timing blocks is at least 16 and wherein an absolute value of the difference between the first number of time slots and the second number of time slots is one.

17. The lighting apparatus according to claim 12, wherein the control module is operable to switch between setting the duty cycle of the voltage control signal to the first value and setting the duty cycle of the voltage control signal to the second value at a frequency to maintain stability of the average value between the first and second values across the fine control period.

18. The lighting apparatus according to claim 12, wherein the voltage converter is a buck converter operable to set the output voltage by increasing the voltage on the low voltage rail based at least partially on the duty cycle of the voltage control signal.

19. The control apparatus according to claim 18, wherein an absolute value of the difference between the first number of time slots and the second number of time slots is one.

20. The control apparatus according to claim 18, wherein the number of timing slots within each of the first and second timing blocks is at least 16 and wherein an absolute value of the difference between the first number of time slots and the second number of time slots is one.

21. The control apparatus according to claim 18, wherein the control apparatus is operable to switch between setting the duty cycle of the voltage control signal to the first value and setting the duty cycle of the voltage control signal to the second value at a frequency to maintain stability of the average value between the first and second values across the fine control period.

22. A control apparatus operable to control a lighting apparatus, the lighting apparatus comprising a voltage converter operable to generate an output voltage based at least partially on a voltage control signal received by the voltage converter, the voltage control signal being high for one or more time slots and low for one or more time slots within each of a plurality of timing blocks within a fine control period,
wherein the control apparatus is operable:
to set a duty cycle of the voltage control signal to a first value for one or more first timing blocks of the fine control period, wherein the voltage control signal is high for a first number of time slots within each of the first timing blocks; and
to set the duty cycle of the voltage control signal to a second value for one or more second timing blocks of the fine control period, wherein the voltage control signal is high for a second number of time slots within each of the second timing blocks, the second number being different than the first number;
wherein the first number of time slots within each of the first timing blocks and the second number of timing slots within each of the second timing blocks have similar relative magnitudes, whereby the duty cycle across the fine control period has an average value between the first and second values to provide an increased resolution to control the output voltage from the voltage converter.

* * * * *